United States Patent
Rao et al.

(10) Patent No.: US 11,468,576 B2
(45) Date of Patent: Oct. 11, 2022

(54) TRACKING WITHIN AND ACROSS FACILITIES

(71) Applicant: NEC Laboratories America, Inc., Princeton, NJ (US)

(72) Inventors: Kunal Rao, Monroe, NJ (US); Utsav Drolia, Milipitas, CA (US); Murugan Sankaradas, Dayton, NJ (US); Srimat Chakradhar, Manalapan, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/178,570

(22) Filed: Feb. 18, 2021

(65) Prior Publication Data

US 2021/0264621 A1   Aug. 26, 2021

Related U.S. Application Data

(60) Provisional application No. 62/979,482, filed on Feb. 21, 2020.

(51) Int. Cl.
*G06T 7/292* (2017.01)
*H04N 7/18* (2006.01)
(Continued)

(52) U.S. Cl.
CPC .............. *G06T 7/292* (2017.01); *G06V 20/52* (2022.01); *G06V 40/161* (2022.01); *G06V 40/172* (2022.01); *G06V 40/50* (2022.01); *H04N 7/181* (2013.01); *G06Q 30/0226* (2013.01); *G06T 2207/10016* (2013.01); *G06T 2207/30201* (2013.01); *G06T 2207/30232* (2013.01)

(58) Field of Classification Search
None
See application file for complete search history.

(56) References Cited

U.S. PATENT DOCUMENTS 9,185,359 B1 * 11/2015 McGee ................. H04N 7/181
2007/0011722 A1 * 1/2007 Hoffman .......... G08B 13/19608
726/3
(Continued)

FOREIGN PATENT DOCUMENTS

| JP | 2017068375 A | | 4/2017 |
|---|---|---|---|
| KR | 20190078845 A | * | 7/2019 |
| KR | 1020190078845 A | | 7/2019 |

*Primary Examiner* — James M Anderson, II
(74) *Attorney, Agent, or Firm* — Joseph Kolodka

(57) ABSTRACT

A method for tracing individuals through physical spaces that includes registering cameras in groupings relating a physical space. The method further includes performing local video monitoring including a video sensor input that outputs frames from inputs from recording with the cameras in the groupings, a face detection application for extracting faces from the output frames, and a face matching application for matching faces extracted from the output frames to a watchlist, and a local movement monitor that assigns tracks to the matched faces. The method further includes performing a global monitor including a biometrics monitor for preparing the watchlist of faces, the watchlist of faces being updated when a new face is detected by the cameras in the groupings, and a global movement monitor that combines the outputs from the assigned tracks to the matched faces to launch a report regarding individual population traveling to the physical spaces.

20 Claims, 20 Drawing Sheets

(51) Int. Cl.
    *G06V 20/52*     (2022.01)
    *G06V 40/50*     (2022.01)
    *G06V 40/16*     (2022.01)
    *G06Q 30/02*     (2012.01)

(56) References Cited

U.S. PATENT DOCUMENTS

2017/0351906 A1*   12/2017   Oguchi  ............ G08B 13/19693
2021/0081657 A1*    3/2021   Zhang  .................. G06K 9/4619

* cited by examiner

TRACKING WITHIN AND ACROSS FACILITIES

This application claims priority to U.S. 62/979,482, filed on Feb. 21, 2020, incorporated herein by reference in its entirety.

BACKGROUND

Technical Field

The present invention relates to system tracking and more particularly to tracking objects in relation to business spaces.

Description of the Related Art

Operators and managers of stores, malls, stadiums, theaters, casinos, hotels, etc. can benefit from knowing more about their visitors, e.g., how often a patron may visit a particular facility, which locations within the facility they visit, and what paths they take, as well as how much time they spend at different locations within the area being analyzed, etc. In some examples, operators and managers of the aforementioned property types may also be interested in knowing when patrons move from one position to another or from one area to another. Knowing this information in real-time can be great value, so that operators and managers of facilities can take action to improve business generation, e.g., business income, and enhance customer experience. This information is also useful in the overall planning, organization, marketing, etc.

SUMMARY

According to an aspect of the present invention, a method is provided for tracking individuals through physical spaces that includes registering cameras in groupings relating to at least one physical space; and recording individuals with the cameras in groupings relating to at least one physical space. The method may further include performing local video monitoring including a video sensor input that outputs frames from inputs from the recording of the individuals with the cameras in the groupings, a face detection application for extracting faces from the output frames, a face matching application for matching faces extracted from the output frames to a watchlist, and a local movement monitor that assigns tracks to the matched faces based on the cameras in the groupings. In a following step, the method can also include performing a global monitor including a biometrics monitor for preparing the watchlist of faces, the watchlist of faces being updated when a new face is detected by the cameras in the groupings, and a global movement monitor that combines the outputs from the assigned tracks to the matched faces to launch a report regarding patron population traveling to the physical space corresponding to the cameras in the groupings.

According to another aspect of the present invention, a system is provided for tracking individuals through physical spaces that includes cameras in groupings relating to at least one physical space. The system further includes a local video monitoring system including a video sensor input that outputs frames from inputs from the recording of the individuals with the cameras in the groupings, a face detection application for extracting faces from the output frames, a face matching application for matching faces extracted from the output frames to a watchlist, and a local movement monitor that assigns tracks to the matched faces based on the cameras in the groupings. The system can also include a global monitor system including a biometrics monitor for preparing the watchlist of faces, the watchlist of faces being updated when a new face is detected by the cameras in the groupings, and a global movement monitor that combines the outputs from the assigned tracks to the matched faces to launch a report regarding patron population traveling to the physical space corresponding to the cameras in the groupings.

In yet another embodiment, a computer program product is provided for tracking individuals through physical spaces, the computer program product includes a computer readable storage medium having computer readable program code embodied therewith, the program instructions executable by a processor to cause the processor to register, using the processor, cameras in groupings relating to at least one physical space; and record individuals with the cameras in groupings relating to at least one physical space. The computer program product can also perform, using the processor, local video monitoring including a video sensor input that outputs frames from inputs from the recording of the individuals with the cameras in the groupings, a face detection application for extracting faces from the output frames, a face matching application for matching faces extracted from the output frames to a watchlist, and a local movement monitor that assigns tracks to the matched faces based on the cameras in the groupings. The computer program product can further perform, using the processor, a global monitor including a biometrics monitor for preparing the watchlist of faces, the watchlist of faces being updated when a new face is detected by the cameras in the groupings, and a global movement monitor that combines the outputs from the assigned tracks to the matched faces to launch a report regarding patron population traveling to the physical space corresponding to the cameras in the groupings.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
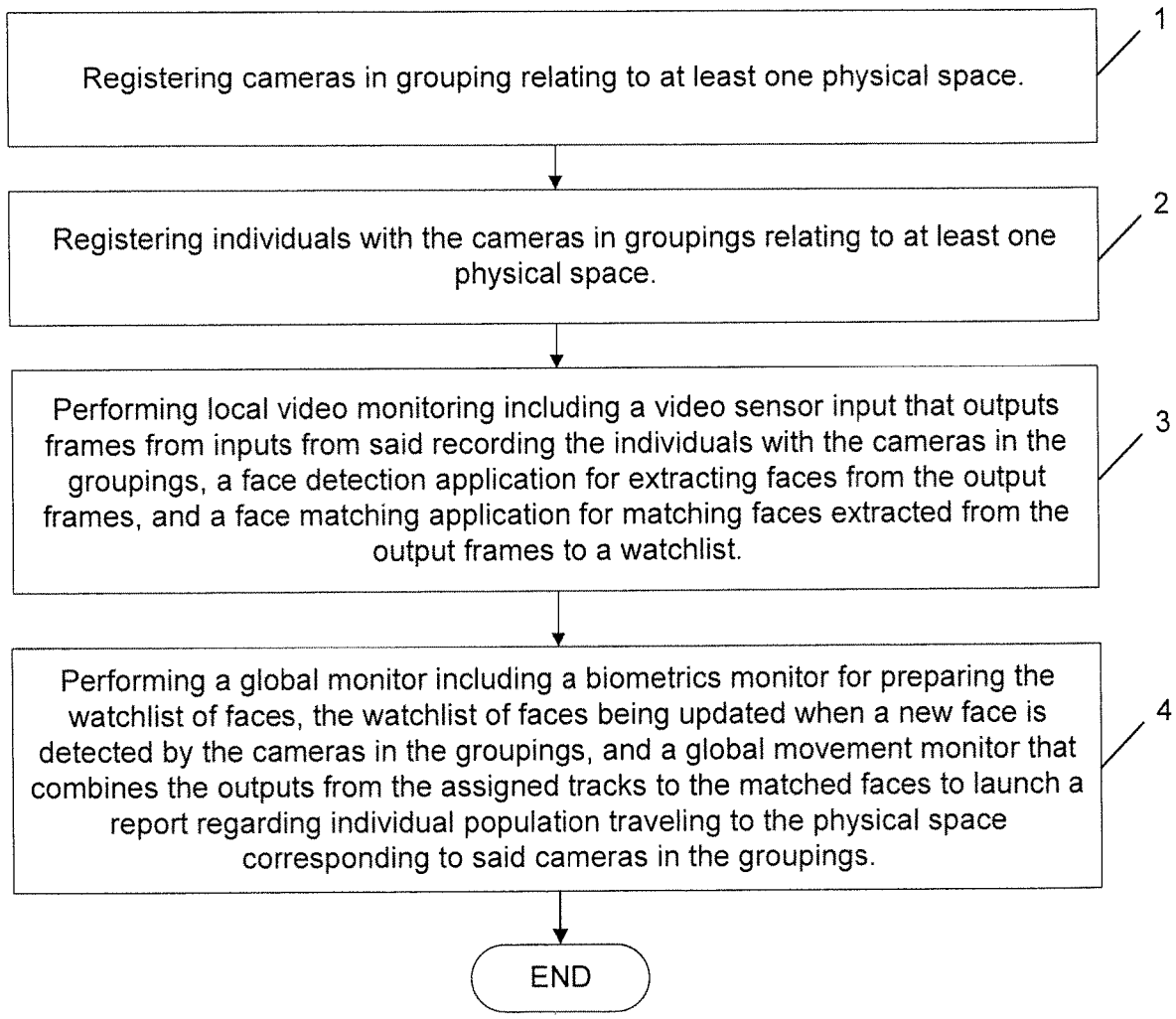
FIG. 1 is a block/flow diagram illustrating a high-level system/method for tracking pedestrians across facilities in real time using grouped cameras and facial recognition, in accordance with an embodiment of the present invention.

In accordance with embodiments of the present invention, systems and methods are provided to/for tracking entities through a physical space in real time.

Operators and managers of stores, malls, stadiums, theaters, casinos, hotels, etc. can benefit from knowing more about their visitors, e.g., how often a patron may visit a particular facility, which locations within the facility do they visit, what paths they take, and how much time they spend at different locations, etc. In some instances, business entities run reward programs in which they try to issue some kind of card/membership, using which they can monitor and track movement of individuals within and across facilities. However, not all individuals participate in this program and most of the time operators and managers of business facilities do not get the full picture with respect to the movement of patrons and business space. In some embodiments, the methods, systems and computer program products of the present disclosure can overcome the aforementioned deficiencies, and can provide that the operators and managers for facilities can get detailed information of any individual (patron) who visits their facility, how often they visit, which locations they visit within the facility, and how much time they spend at each location, etc. This can be done in an anonymous manner, without any enrollment of the patrons required. To provide these advantages, in some embodiments the methods, systems and computer program products employ facial recognition methods in combinations with groupings of cameras throughout the plurality of regions through which the operator/manager of a facility wishes to track individuals, e.g., patrons. Along with this, the methods, systems and computer program products can also identify the specific positions of individual in a marked area and when the individual moves from one position to another. The tracking information is delivered to the operators/managers of the facility in real-time. The term "real-time" denotes the actual time during which a process or event occurs. In this example, the data is provided to the operators as the individuals are moving from one location to another, e.g., in real time.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks.

Modems, cable modem and Ethernet cards are just a few of the currently available types of network adapters.

Referring now in detail to the figures in which like numerals represent the same or similar elements and initially to FIG. 1, a high-level system/method for tracking patrons through physical spaces, such as between buildings, and/or rooms, is illustratively depicted in accordance with one embodiment of the present invention.

In one embodiment, the methods, systems and computer program product of the present disclosure invention solves the problem using facial recognition. In some embodiments, cameras are deployed across various points of interest/locations within the facility and across facilities. Multiple cameras are deployed close to each other and grouped together in areas where exact position of individual, and movement from one position to another, is desired. Individuals visiting any facility for the first time are "auto-enrolled" anonymously in a database, as soon as they are seen in front of any of the deployed cameras, and tracking of their movement within and across facilities immediately begins. Movement activity, including, when the individual "enters", "is present" or "leaves" a particular location, or "moves" from one position to another within an area, is monitored and delivered to the owners in real-time. All this information is also stored and available for post-analysis, if the owner chooses to do so.

Referring to FIG. 1, the method for tracking individuals in real time using facial recognition can begin with registering camera's in groupings corresponding to different locations within regions, e.g., facilities, at block 1. At block 2, the method can continue with recording individuals with the cameras in groupings relating to at least one physical space. Turning to block 3, the method may further include performing local video monitoring. The local video monitoring may include a video sensor input that outputs frames from inputs from recording the individuals with the cameras in the groupings, a face detection application for extracting faces from the output frames, and a face matching application for matching faces extracted from the output frames to a watchlist. A local movement monitor assigns tracks to the matched faces based on the cameras in the groupings. The method may further include performing a global monitor process at block 4. The global monitor process includes a biometrics monitor for preparing the watchlist of faces, the watchlist of faces being updated when a new face is detected by the cameras in the groupings, and a global movement monitor that combines the outputs from the assigned tracks to the matched faces to launch a report regarding individual population traveling to the physical space corresponding to the cameras in the groupings.

Figure 2:
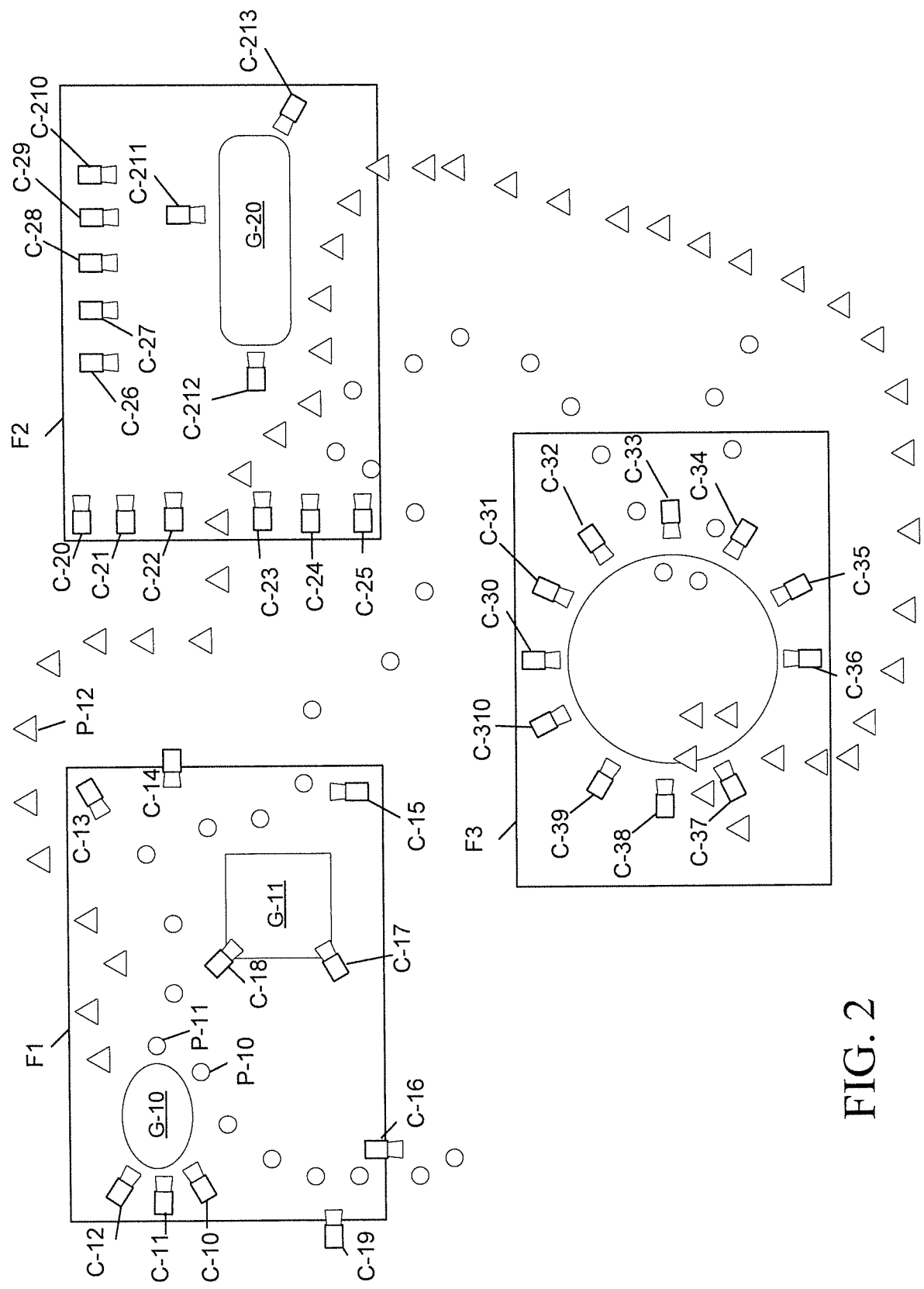
FIG. 2 is an illustration of a layout of grouped camera in a physical location tracking pedestrians across facilities in real time.

FIG. 2 is an illustration of a layout of grouped cameras in a physical location tracking pedestrians across facilities in real time. In the example depicted in FIG. 2, there are three regions denoted by reference numbers F-1, F-2 and F-3. The regions identified by F-1, F-2 and F-3 in FIG. 3 can represent three geographically distributed facilities of a specific owner. There can be any number of such facilities.

Cameras having reference numbers c-10, c-11, c-12, c-13, c-14, c-15, c-16, c-17, c-18, and c-19 are depicted in region F-1; cameras having reference numbers c-20, c-21, c-22, c-23, c-24, c-25, c-26, c-27, c-28, c-29, c210, c-211, c212, and c-213 are depicted in region F-2; and cameras having reference numbers c-30, c-31, c-32, c-33, c-34, c-35, c-36, c-37, c-38, c-39 and c-310 are depicted in region F-3. The regions F-1, F-2, and F-3 may be different facilities. The cameras are strategically deployed within each facility F-1, F-2, F-3 so that all important areas/locations and points of interest, where tracking of movement of individuals is desired, are covered by these cameras. Multiple cameras are placed and grouped together, where fine-grained position and movement across positions is desired. G-10 represents one such group of cameras in the first facility F-1, the cameras in this grouping including C-10, C11 and C12. Movement of two individuals are marked using a circle P-10, P-11 and a triangle P-12. These individuals move across three facilities and as they move, they are being tracked across various cameras and recognized using facial-recognition. Real-time movement of individuals is monitored and reported, including when the person enters a particular location/position, moves from one location/position to another, is still present at a particular location/position and leaves a particular location/position.

An example trace of movement of the individual marked by a circle would look as follows, in which <id-1> is an identifier specific to an individual that is first designated following facial recognition, and <timestamp> is a measurement of time for that individual at a specific camera location:

1. Person <id-1> entered at camera C-16 in facility F-1 at <timestamp>
2. Person <id-1> still present at camera C-16 in facility F-1 at <timestamp>
3. Person <id-1> left from camera C-16 in facility F-1 at <timestamp>
4. Person <id-1> entered at camera C-19 in facility F-1at <timestamp>
5. Person <id-1> left from camera C-19 in facility F-1 at <timestamp>
6. Person <id-1> entered at position P-10 at camera C-12, which is part of group G-10 in facility F-1 at <timestamp>
7. Person <id-1> still present at position P-10 at camera C-12, which is part of group G-10 in facility F-1 at <timestamp>
8. Person <id-1> moved from position P-10 to position p-11 at camera C-11, which is part of group G-10 in facility F-1 at <timestamp>
9. Person <id-1> still present at to position P-11 at camera C-11, which is part of group G-10 in facility F-1 at <timestamp>
10. Person <id-1> left position P-11 at camera C-11, which is part of group G-10 in facility F-1 at <timestamp>
11. Person <id-1> entered at camera C-14 in facility F-1 at <timestamp>
12. Person <id-1> left from camera C-14 in facility F-1 at <timestamp>
13. Person <id-1> entered at camera C-15 in facility F-1 at <timestamp>
14. Person <id-1> left from camera C-15 in facility F-1 at <timestamp>
15. Person <id-1> entered at camera C-24 in facility F-2 at <timestamp>
16. Person <id-1> still present at camera C-24 in facility F-2 at <timestamp>
17. Person <id-1> left from camera C-24 in facility F-2 at <timestamp>
18. Person <id-1> entered at camera C-33 in facility F-3 at <timestamp>
19. Person <id-1> still present at camera C-33 in facility F-3 at <timestamp>
20. Person <id-1> left from camera C-33 in facility F-3 at <timestamp>
21. Person <id-1> entered at camera C-34 in facility F-3 at <timestamp>
22. Person <id-1> left from camera C-34 in facility F-3 at <timestamp>

For a person, who is seen for the first time, the person would be "auto-enrolled" and will receive an id, which will be used to track movement of the individual across cameras. In the example, above, the first person enrolled would be <id-1>. Following <id-1>, the second individual that is auto-enrolled would be <Id-2>. By "auto-enrolled" it is meant that the system records an identity for a patron corresponding to facial recognition data, assigns an identifying tag to that identity, and does these functions without any interaction from the individuals beyond merely their presence that is recorded by a camera. "Facial recognition" is a technology for matching a human face from a digital image or a video frame against a database of faces, typically employed to authenticate users through ID verification services, works by pinpointing and measuring facial features from a given image. In some embodiments, facial recognition is provided by a facial recognition system. Upon finding matches, the facial recognition system assigns the identifying tag, e.g., <id-1>, to the facial images that are saved for the individual in a facial image database.

Figure 3:
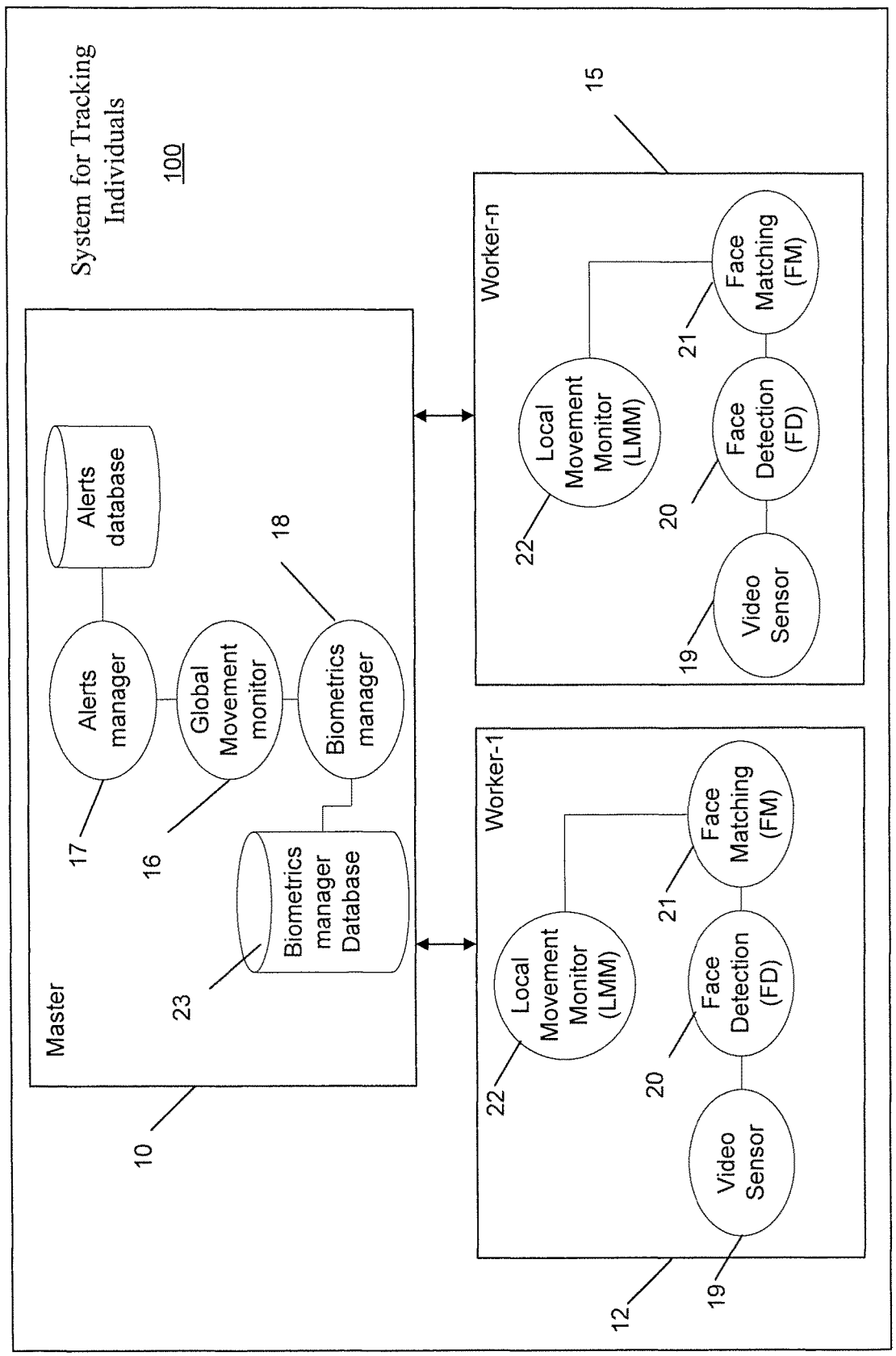
FIG. 3 is an illustration of a system architecture that provides for tracking individuals within and across physical regions, such as real property, in accordance with one embodiment of the present disclosure.

FIG. 3 illustrates one embodiment of the overall architecture for the system 100 that provides distributed streaming video analytics to monitor and track individuals within and across geographically distributed facilities, e.g., regions F-1, F-2, F-3. In some embodiments, the system 100 includes a master 10 and one/more workers, e.g., worker-1 12 and worker-n 15, that are connected to the master 10. For example, the workers, e.g., worker-1 12 and worker-n 15, can be connected to the master 10 via LAN/WAN. The master 10 handles watchlist management and alerts management. The workers, e.g., worker-1 12 and worker-n 15, do the actual computation for monitoring and sending out trace of individuals within and across facilities. Depending on the computational resources available on workers, single or multiple video stream(s) can be handled by each worker.

The overall system comprises of multiple applications/ micro-services, together forming a use case. Instances of these applications are created and interconnected appropriately, forming a use case topology.

Each worker 12, 15 can handle a number of applications. For example, each worker 12, 15 can handle applications such as video sensors (VS), face detection (FD), face matching (FM), and a local movement monitor (LMM). For example, the master 10, which is in communication with the worker 12, 15 can handle applications, such as a global movement monitor (GMM) 16, an alerts manager (ALM) 17 and a biometrics manager (BM) 18.

An instance of the use case, including the above application instances is created and run to provide a mechanism by which individuals can be tracked through their movements within and between real properties. Among the application instances forming the use case topology is an alerts-manager 17, biometrics-manager 18 and global-movement-monitor 16 instances that can be marked as 'uniqueSiteWide', which means that only a single instance is created across site-wide deployment and reused by all use case instances. These instances (use case instances) are run on the master 10, while instances of video-sensor 19, face-detection 20, face-matching 21 and local-movement-monitor 22 are run on workers to process camera video streams.

In one embodiment, the overall process flow may employ the biometrics manager application 18 run by the master 10 provides REST APIs for managing watchlist(s) and people in the watchlist(s). It maintains a database 23 to store all people and Watchlist(s) details. An "API" is an application programming interface. It is a set of rules that allow programs to talk to each other. The API on the may be on the master 10 and allows the workers 12, 15 to talk to it. REST determines how the API looks like. It stands for "Representational State Transfer". It is a set of rules that the API will follow.

The processing flow can include the biometrics manager of the master 10 to provide REST APIs for managing watchlist(s) and people in the watchlist(s). It maintains a database, e.g., biometrics manager database 23, to store all people and watchlist(s) details. The various functions supported by biometrics-manager through REST APIs can include: (1) the ability to add/update/remove watchlist(s), (2) ability to turn ON/OFF monitoring for watchlist(s), (3) ability to add/update/remove people in the watchlist(s), (4) ability to search for a particular person using name or image of the person, and (5) ability to merge records/entries for the same person.

Turning to the workers 12, 15, a video sensor (VS) application can connect to the cameras, such as the cameras described above with reference to FIG. 2. The video sensor (VS) application retrieves a camera feed. The video sensor (VS) application emits video frames as an output. The workers 12, 15 may also employ a face detection application 20. The face detection (FD) application 20 connects to the output from the video sensor 19. The face detection application (FD) 20 retrieves video frames, performs face detection and face tracking across video frames and emits detected faces along with face track information as output. The workers 12, 15 also employ a face matching application 21. The face matching application 21 connects to output from face-detection 20, retrieves detected faces, matches these faces against the faces in the watchlist(s) and sends out detected faces along with face track and face match information. Face-matching instance connects to biometrics-manager instance 18 to obtain watchlist(s) information along with details of people who are in the watchlist(s). Any updates to watchlist(s) are obtained by face-matching instance by periodically connecting and checking with biometrics-manager instance 18. The biometrics manager application is run by the master 10.

The workers 12, 15 include a local movement monitor (LMM) 22. The local movement monitor (LMM) 22 connects to output from face-matching, retrieves detected and matched faces, along with tracking information, processes them to identify and provide information to report local movement activity of the individual at this particular camera i.e. entered the camera, still present in front of the camera, moved within region-of-interest in the camera and left from the camera. This is reported to global-movement-monitor (GMM) instance application 18, which is run by the master 10.

The global movement monitor (GMM) 18 receives all local-movement information and combines them, if required, to provide global movement information e.g. if a person moves from one position to another within an area (covered by multiple cameras). In some embodiments, the global-movement-monitor (GMM) application 18 can also "auto-enrolls" individuals in the watchlist database, if they are seen for the first time at any of the cameras.

The master 10 also includes an alerts manager (AM)) application 17. The alerts manager application 17 receives the alerts from global-movement-monitor instance 18, writes the alerts in the alerts database and also publishes the alerts for any other/third-party application to consume. It also exposes HTTP(s)-based RESTful API to retrieve historical alerts for post-analysis purpose.

Each application in the use case topology including the master 10 and workers 12, 15 includes of spouts and bolts forming an application topology. Spouts are individual threads, which handle the input data stream and pass it on to successive bolt(s) in the chain. Spouts act as adapters that connect to a source of data, transform the data into tuples, and emit the tuples as a stream.

Bolts are individual threads, which process and transform the input data stream received from previous spout(s)/bolt(s) in some way and pass the transformed data items/tuples to the next bolt(s) in the chain.

Bolts can be thought of as the operators or functions of a computation. They take as input any number of streams, process the data, and optionally emit one or more streams. Bolts may subscribe to streams emitted by spouts or other bolts, making it possible to create a complex network of stream transformations.

For example, the video sensor (VS) application topology 19 can include a camera-spout, which connects to video camera, retrieves and renders video frames and publishes them as output for other applications to consume. The camera spout supports connection to various types, makes and models of cameras. The frames are the output of the camera spout.

Figure 4:
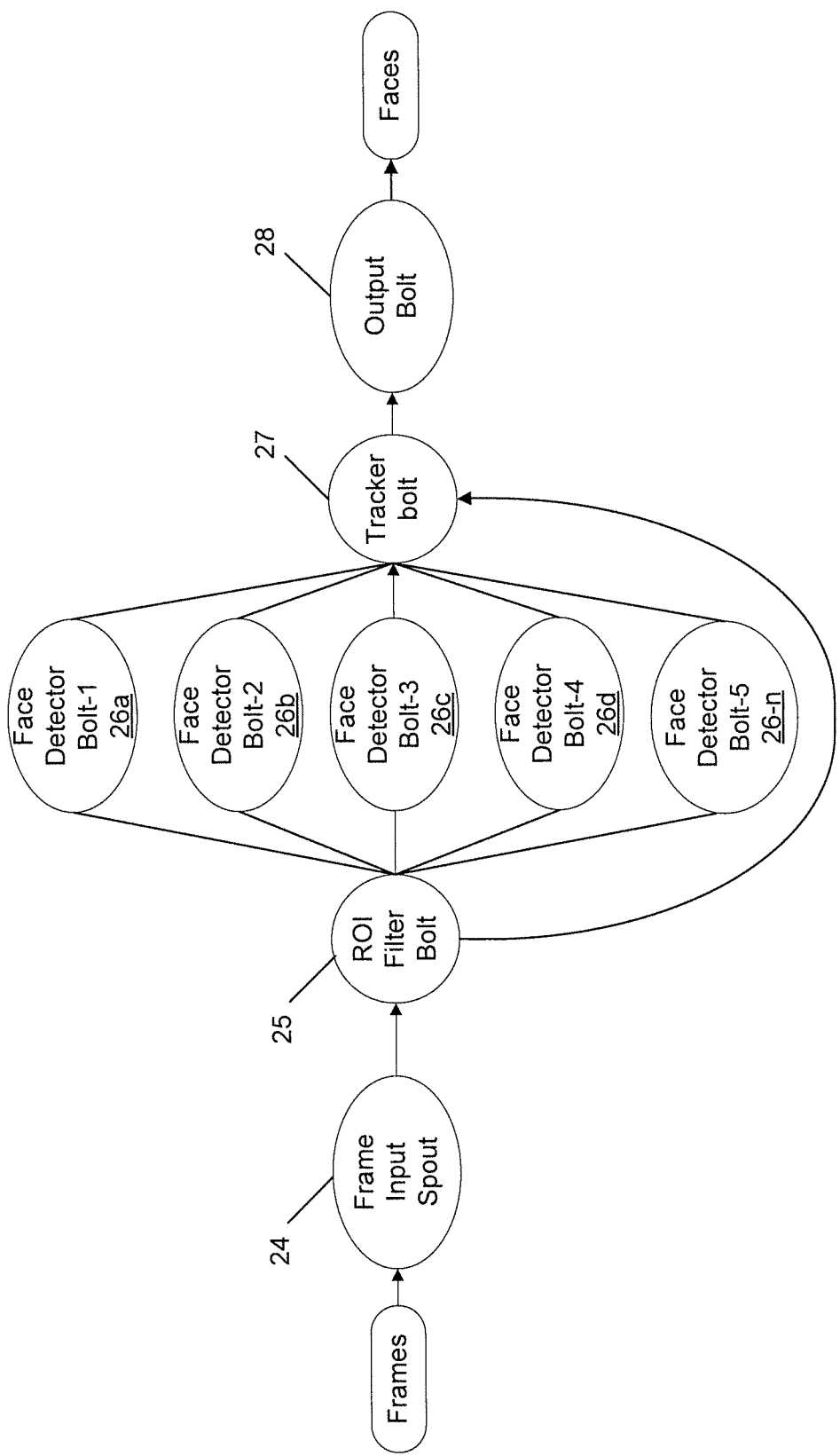
FIG. 4 is an illustration of a face detection application topology, in accordance with one embodiment of the present disclosure.

In some examples, the frames which are the output of the camera spout provide the input to the face detection application topology, which is illustrated in FIG. 4. The face detection application topology receives video frames as input and emits detected faces as output. The process flow for the face detection application may include a frame-input-spout 24 that connects to output from video-sensor 19 (which may be the output from the camera spout), and receives the video frames and emits them to ROI-filter-bolt 25 using a broadcast connection. Still referring to FIG. 4, the region of interest (ROI) filter bolt 25 receives frames from frame-input-spout 24, filters the region of interest within the frame, discards the unwanted portion in the frame, and emits the transformed frame, including only the region of interest in the frame to face-detector-bolts 26a, 26b, 26c, 26d, 26-n using Shuffle connection. A shuffle connection sends tuples to bolts in random order. A tuple is a grouping of data.

As depicted in FIG. 4, the face-detector-bolt 26a, 26b, 26c, 26d, 26-n has multiple instances running in parallel, and each of them receives a frame from ROI-filter-bolt 25, detects faces in the received frame, extracts features of the detected faces and emits them to tracker-bolt 27 using broadcast connection. The tracker-bolt 27 receives frames from ROI-filter-bolt and detected faces from face-detector-bolt instances 26a, 26b, 26c, 26d, 26-n does face tracking across frames and emits detected faces along with extracted features and face track information to output-bolt 28. The output-bolt 28 receives detected faces along with extracted features and face tracking information from tracker-bolt 27 and publishes them as output for other applications to consume.

Figure 5:
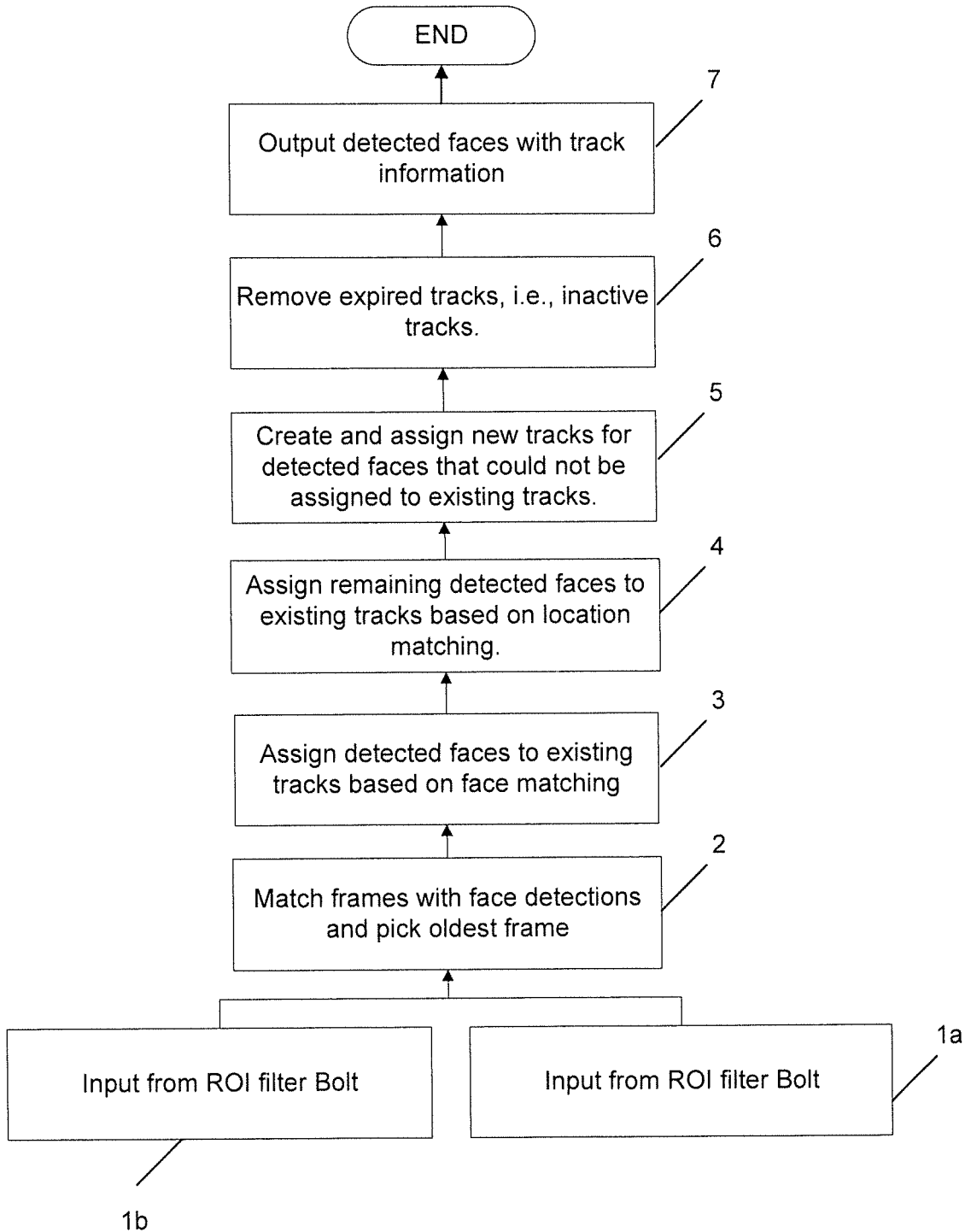
FIG. 5 depicts one embodiment of the execution procedure followed by tracker-bolt to track faces across frames, in accordance with one embodiment of the present disclosure.

FIG. 5 depicts one embodiment of the execution procedure followed by tracker-bolt 27 to track faces across frames. At blocks 1a and 1b of FIG. 5, the tracker-bolt 27 receives the transformed frames from ROI-filter-bolt 25 and faces detected in the frame from face-detector-bolt(s) 26a, 26b, 26c, 26d, 26-n. At block 2, upon receiving these inputs, the tracker-bolt 27 matches the frames with the face detections for those frames and starts assigning track information for the detected faces from the least recent frame, e.g., the oldest frame is selected based on time. Referring to block 3, tracker bolt 27 assigns detected faces to existing tracks based on face matching. For example, every detected face is then matched with detected faces assigned to existing tracks, and if the match score is above a certain pre-defined threshold, then that track information is assigned to the detected face.

In a following step, remaining detected faces are assigned to existing tracks based on location matching at block 4. In one example, after the tracker bolt 27 assigns detected faces to existing tracks based on face matching, all the remaining faces that could not be assigned track information based on face matching, are assigned track information based on location matching, if possible. For location matching, the tracker-bolt 27 can compute a distance matrix with distances between detected faces and the existing tracks. In some embodiments, the minimum distance in the distance matrix is picked, and if it is lower than a pre-defined threshold, indicating that the location of the bounding box of the detected face is close to the corresponding track, then the corresponding, existing track is assigned to the detected face. The row and column corresponding to this minimum entry is marked with a maximum distance value. The minimum distance in the matrix is again picked and same location-based track assignment procedure is applied to assign track to the detected face. This procedure is repeated until no more tracks can be assigned to detected faces based on location matching.

Referring to block 5, the sequence can continue with creating an assigning new tracks for detected faces that could not be assigned to existing tracks. For example, for all the remaining detected faces, e.g., faces which could not be assigned tracks either based on face matching or location matching, new tracks are created and assigned for these faces, indicating that they are being seen for the first time, therefore a new track is created for the face.

Turning to block 6, expired tracks, e.g., inactive tracks, are removed. Every time a face is assigned to the track or a new track is created, the timestamp for the track is updated. All tracks, having last updated timestamp that is older than a pre-defined time interval, are considered as expired, e.g., inactive tracks. All such expired/inactive tracks are removed. At block 7, after removal of expired/inactive tracks, if any, the tracker-bolt 27 emits the detected faces with track information to the output-bolt 28.

Figure 6:
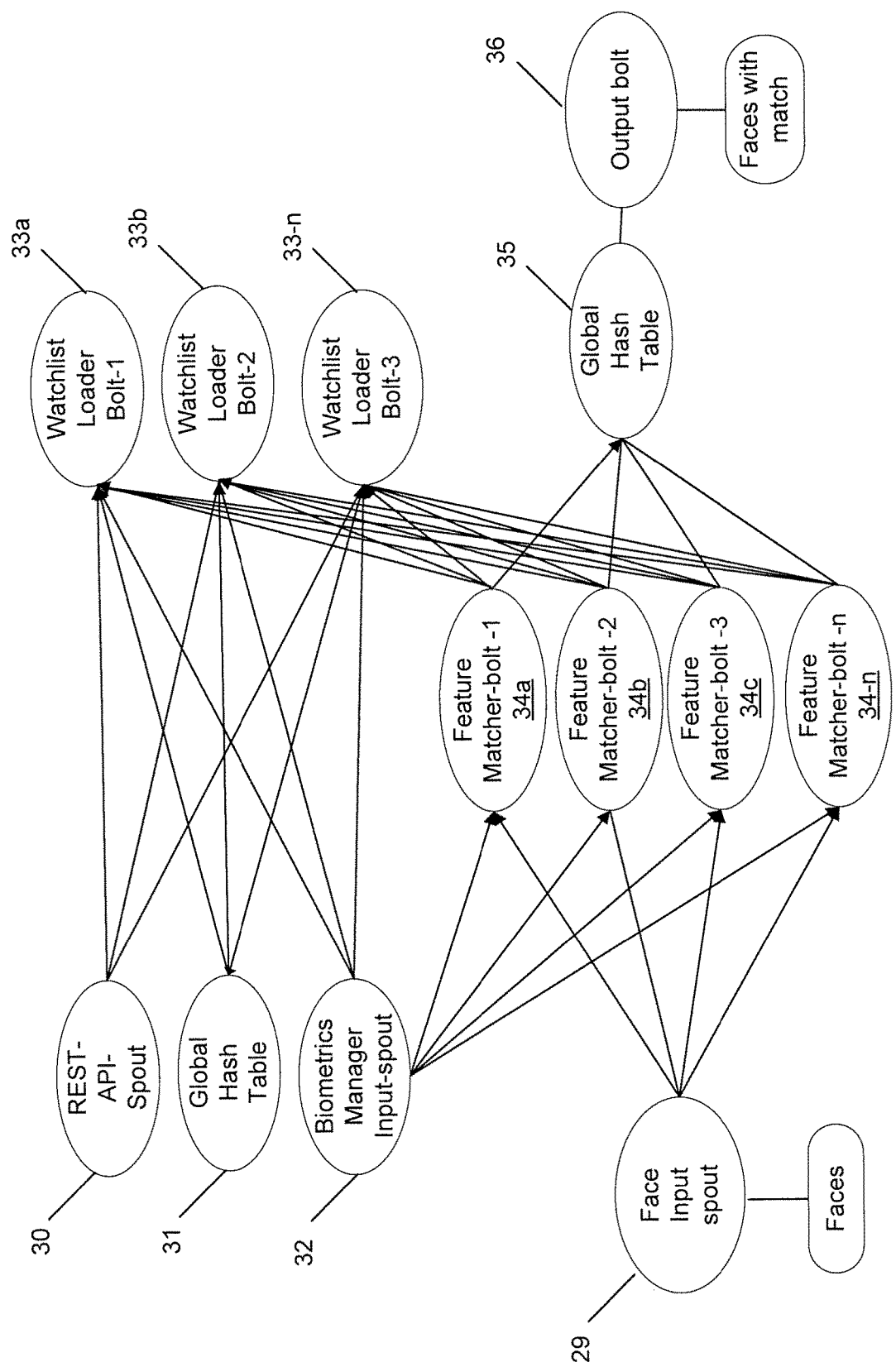
FIG. 6 illustrates one embodiment of the face matching application topology, in accordance with one embodiment of the present disclosure.

FIG. 6 illustrates one embodiment of the face matching application topology. In some embodiments, the face-matching application topology receives detected faces as input and publishes detected faces along with face match information as output. In some embodiments, the face-input-spout 24 connects to output from face-detection application, receives detected faces along with their extracted features and face track information as input, and emits them to feature-matcher-bolt instances 34a, 34b, 34c, 34-n using a shuffle connection.

Still referring to FIG. 6, a REST-API-Spout 30 processes requests for querying loading status or actual loading of watchlist(s).

If the request being processed by the REST-API-spout 30 is to load watchlist(s), then the REST-API-spout 30 emits this loading request to watchlist-loader-bolt instances using shuffle connection. If the request is to query the loading status, then the REST-API-spout 30 retrieves and returns the loading status of watchlist(s). Status of watchlist(s) loading is maintained by face-matching topology in a global hash table 31.

Biometrics management includes a biometrics-manager-input-spout 32 that works in combination with the watchlist-loader-bolt 33a, 33b, 33-n. In some embodiments, the biometrics-manager-input-spout 32 upon start-up, emits watchlist(s) loading request to watchlist-loader-bolt instances 33a, 33b, 33-n using shuffle connection.

In some embodiments, the biometrics-manager-input-spout 32 connects to biometrics-manager of the master 10, receives notification(s) and emits them to feature-matcher bolt instances 34a, 34b, 34c, 34-n using broadcast connection. These notification(s) could include at least one of Addition/Update/Removal of watchlist(s); Addition/Update/Removal of people in watchlist(s); turn ON or OFF monitoring for watchlist(s); re-download watchlist(s) and watchlist(s) synchronization status updates.

In some embodiments, the watchlist-loader-bolt 33a, 33b, 33-n has multiple instances running in parallel to serve watchlist(s) loading requests, e.g., from the rest API-spout 30. Watchlist-loader-bolt instances 33a, 33b, 33-n connect to biometrics-manager instance 32 to download watchlist(s) along with people details in the watchlist(s), including their features, and emit them to feature-matcher-bolt instances 34a, 34b, 34c, 34-n using a tag connection.

The key for the tag connection is the person Id, thereby all updates for a particular person, will be passed to the same instance of feature-matcher-bolt which received the first update for the person. The status of loading of watchlist(s) is updated by watchlist-loader-bolt instances 33a, 33b, 33-n in a global hash table.

The feature-matcher-bolt 34a, 34b, 34c, 34-n has multiple instances running in parallel. Each instance of feature-matcher-bolt 34a, 34b, 34c, 34-n loads a portion of the watchlist(s), including person details along with their features, matches the received face against the partial watchlist(s) that is loaded, and emits match result to combiner-bolt 35 using broadcast connection.

The combiner-bolt 35 receives partial match results from all feature-matcher-bolt instances 61a, 61b, 61-n, computes the best match result from the partial matches, adds face match information to detected faces and sends it to output-bolt 36. The output bolt 36 receives the matched face from combiner-bolt 35 and publishes detected faces along with match information for other applications to consume.

Figure 7:
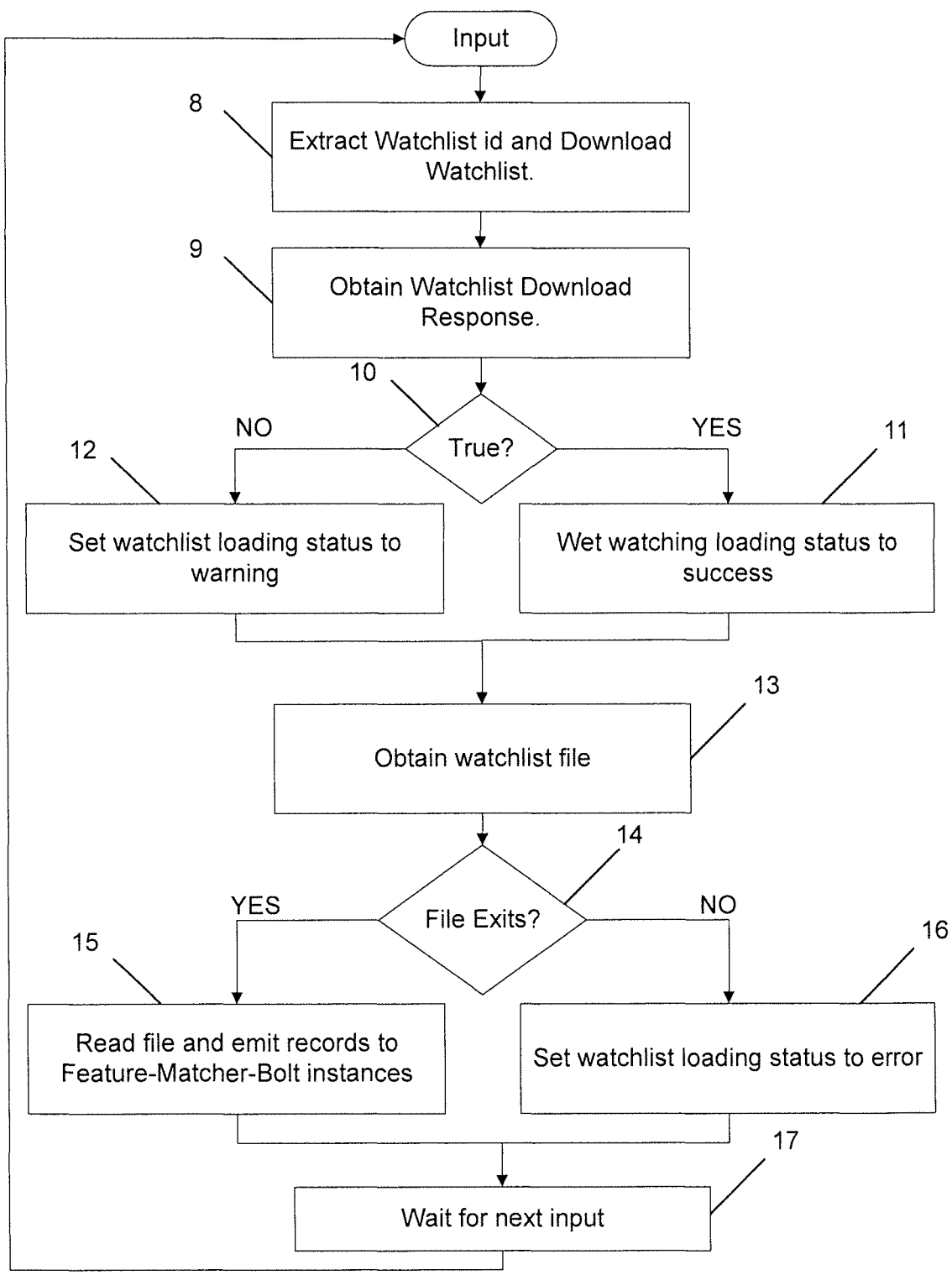
FIG. 7 is a flowchart depicting the execution procedure followed by watchlist-loader-bolt instances to download a particular watchlist, in accordance with one embodiment of the present disclosure.

FIG. 7 is a flowchart depicting the execution procedure followed by watchlist-loader-bolt instances 33a, 33b, 33c to download a particular Watchlist. In some embodiments, the watchlist-loader-bolt instance 33a, 33b, 33c first extracts the watchlist Id from the input and tries to download the watchlist at blocks 8 and 9. If the download response is "True" at block 10, then the status of loading watchlist is set to "success" at block 11. If the download response is not "True" at block 10, then the status of loading Watchlist is set to "warning" at block 12. Watchlist-loader-bolt instance 33a, 33b, 33c then obtains and checks if the watchlist file exists or not at block 14. If it does, then it reads the watchlist file and emits the records to feature-matcher-bolt 34a, 34b, 34c, 34-n instances using tag connection at block 15. The watchlist-loader-bolt instance 33a, 33b, 33c then continues to wait for next input at block 17. If a watchlist file is not found at block 14, then the status of watchlist loading is set to "error" at block 16, and watchlist-loader-bolt instance 33a, 33b, 33c continues to wait for next input at block 17.

Figure 8:
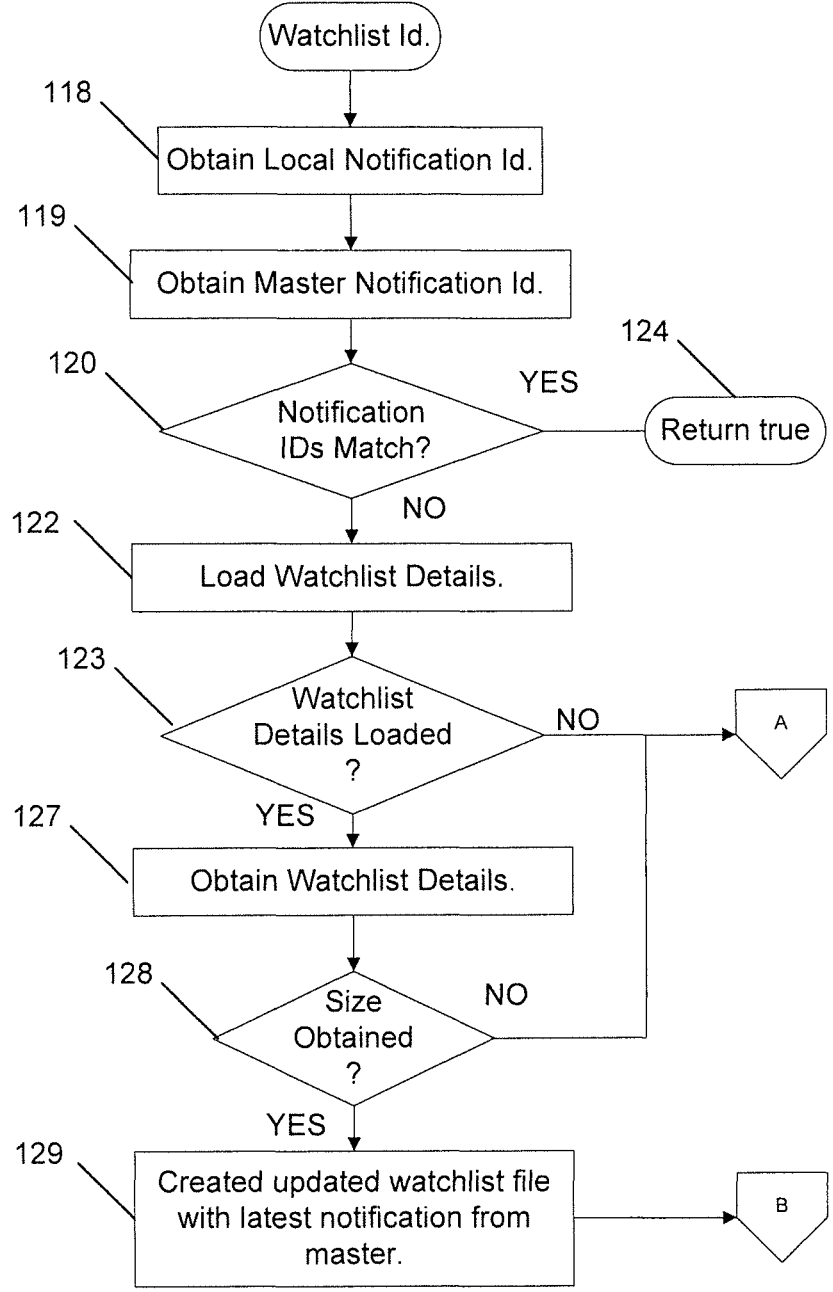
FIG. 8 is part 1 a flowchart illustrating one example of the procedure followed by watchlist-loader-bolt instance to download the watchlist.
Figure 9:
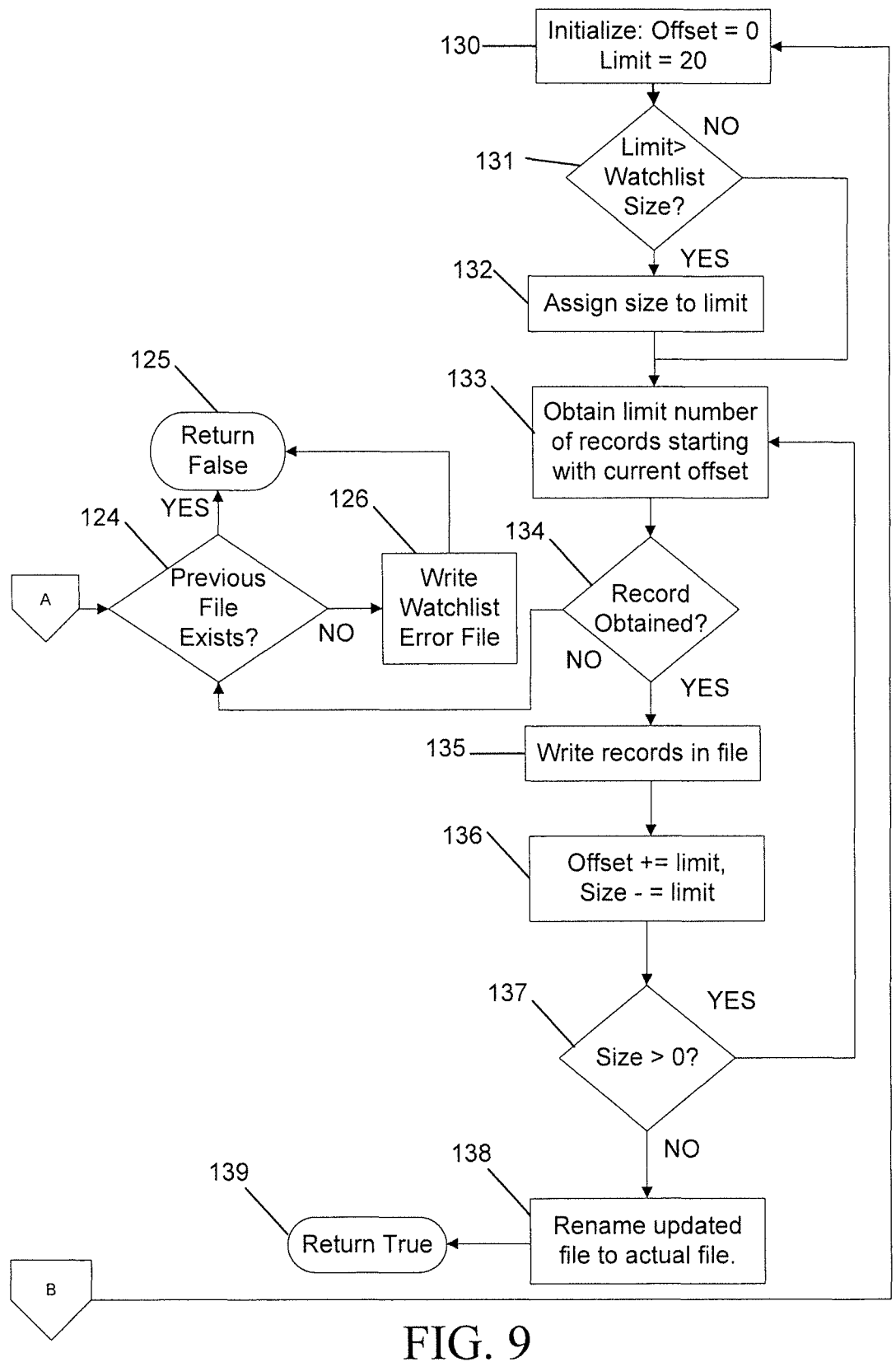
FIG. 9 is part 2 a flowchart of the flow chart beginning in FIG. 8 illustrating one example of the procedure followed by watchlist-loader-bolt instance to download the watchlist.

FIGS. 8 and 9 illustrate a flowchart illustrating one example of the procedure followed by watchlist-loader-bolt instance 33a, 33b, 33c to download the watchlist. FIG. 8 is part 1 of the process flow, in which the process flows continues with part 2 depicted in FIG. 9, in which page connectors labels "A" and "B" illustrate points of connectivity between FIGS. 8 and 9.

Referring to block 118, upon receipt of request for downloading a particular watchlist Id, watchlist-loader-bolt instance 33a, 33b, 33c initially obtains local notification Id, in the saved file on the worker, if it exists, otherwise marks local notification Id as −1. This local notification Id is the latest notification id for the watchlist, which was downloaded previously. Referring to block 119, after obtaining the local notification Id, the latest notification Id on the master for the watchlist is obtained from biometrics-manager (BM) of the master 10 in the topology depicted in FIG. 3.

The notification Ids are then compared and matched at block 120. If the local notification Id and the one on the master are the same at block 120, then there is no need to download again since the watchlist is already downloaded on the worker and watchlist-loader-bolt instance returns true at block 121. If the notification Ids do not match at block 120, then watchlist details is loaded from biometrics-manager, including watchlist name, color, and any other metadata associated with the watchlist at block 122.

Referring to block 123, a check is then performed to see if loading watchlist details from biometrics-manager was successful or not. If the loading wasn't successful at block 123, then the watchlist-loader-bolt instance 33a, 33b, 33c checks if any previously downloaded file for the watchlist exists at block 124. If one exists, then watchlist-loader-bolt instance returns false at block 125, signifying that the loading was not successful and uses the previously-downloaded file. However, if there is no previously downloaded file, then the watchlist-loader-bolt instance 33a, 33b, 33c writes an error file with watchlist Id and returns false at blocks 125 and 126. This error file signifies that the loading of watchlist wasn't successful and needs to be re-tried later.

Referring back to block 123 of FIG. 8, if the watchlist details are loaded successfully, then watchlist size is obtained from biometrics-manager. This size is the total number of people registered in the watchlist. At block 128, the watchlist-loader-bolt instance 33a, 33b, 33c checks if the size was obtained successfully or not. If the size was not obtained, then the process flow continues to determining whether a previous file exists at block 24.

Referring back to block 128, if the size was obtained successfully, then another file including watchlist Id and ending with ".updated" extension is created and latest notification id obtained from master is noted in the file at block 129.

Still referring to FIG. 9, in a following step at block 130, the variables i.e. 'offset' and 'limit' are initialized to 0 and 20 respectively. At block 131, a check is performed to see if 'limit' is greater than watchlist size. If 'limit' is not greater than watchlist size, then watchlist-loader-bolt advances to block 133.

Referring back to block 131 of FIG. 9, if 'limit' is greater than the watchlist size, then watchlist size is assigned to 'limit' at block 132. Referring to block 133, the watchlist-loader-bolt 33a, 33b, 33-n obtains 'limit' number of records from Biometrics-Manager starting with the current 'offset. A check is performed at block 134 to see if the records were successfully obtained or not. If the records weren't obtained, then watchlist-loader-bolt instance 33a, 33b, 33-n extends back to block 124. If the records were obtained successfully, then they are written in the file at block 135.

In some embodiments, once a batch of records is obtained, the offset is then increase by 'limit' and size is reduced by 'limit' at block 136. Referring to block 137, the Watchlist-Loader-Bolt instance checks if the size is greater than 0. If it is greater than 0, e.g., there are more records to download, and the process can step back to block 133. As illustrated, the process can then continue forward with the process flow from block 133.

Still referring to FIG. 9, if the size is not greater than 0 at block 137, e.g., all records are downloaded, then the file created with ".updated" extension is renamed to file with just the watchlist Id in the name at block 138, and the watchlist-loader-bolt instance 33a, 33b, 33-n returns true at block 139.

Figure 10:
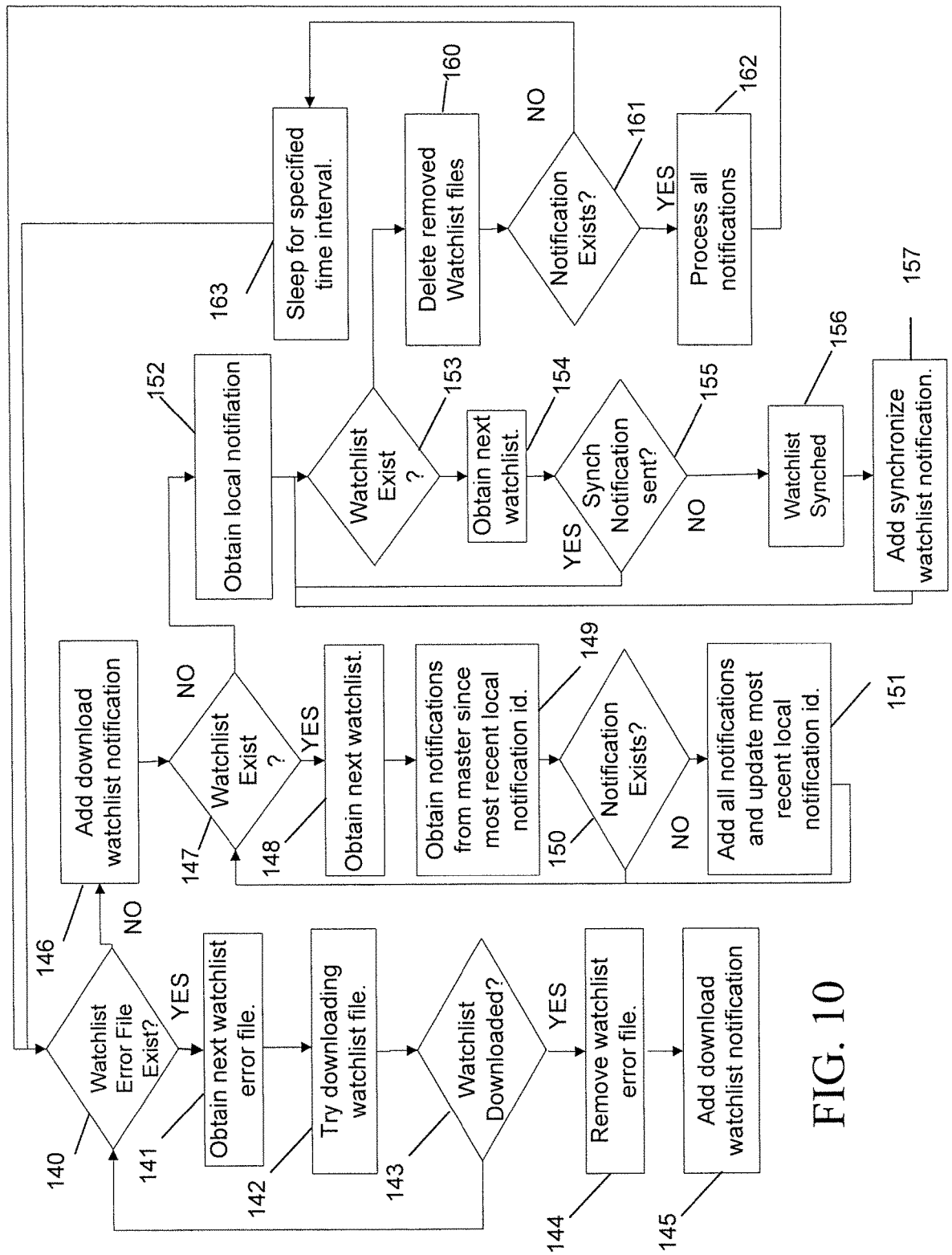
FIG. 10 is a flowchart illustrating one embodiment of the procedures followed by the biometrics-manager-input-spout to retrieve notification(s) from the biometrics-manager.

FIG. 10 illustrates one embodiment of the procedures followed by the biometrics-manager-Input-Spout 32 to retrieve notification(s) from biometrics-manager. In some embodiments, the biometrics-manager-input-spout 32 checks if any Watchlist error files exist at block 140. If yes, the biometrics-manager-input-spout 32 then obtains a next watchlist error file at block 141, and watchlist is (re)tried to download at block 142 using the watchlist download procedure mentioned in FIG. 7. If watchlist is successfully downloaded at block 143, then error file is removed at block 144, and a 'download' Watchlist notification is added at block 145. If watchlist is not downloaded successfully at block 143, then next error file is obtained cycling back to block 140 until no more error files exist.

Referring to FIG. 10, in some embodiments, the biometrics-manager-input-spout 32 after trying to re-download watchlist(s), which failed to download previously, biometrics-manager-input-spout 32 then obtains local notification ids for all watchlists at block 146. For each watchlist, all notifications are from the master 10 since the most recent local notification id are obtained and added to notifications at blocks 148 and 149. These notifications are related to addition/update/removal of watchlist/person. Local notification id is then updated to the most recent notification id at block 151, if notifications were found and added at block 150.

Once all notifications for watchlist(s) are added, biometrics-manager-input-spout 32 then obtains the current local notification ids for all Watchlists at block 152. For each watchlist, the biometrics-manager-input-spout 32 checks if "Synch" notification was sent for the watchlist at blocks 153 and 154. If the notification was sent at block 55, then next watchlist is checked (at block 53), otherwise, biometrics-manager-input-spout 32 checks if the watchlist is in synch with the master 10 at block 156, e.g., the local notification id and the most recent notification on master obtained from biometrics-manager are the same, then 'synchronized' watchlist notification is added at block 159.

FIG. 10 further depicts that after adding 'synchronized' watchlist notification at block 159 for all the watchlists at block 153, the biometrics-manager-input-spout 32 deletes watchlist files for all the watchlist(s) that were removed at block 160. If notifications were found to be added while following the above procedure at block 161, then they are processed one by one, and either emitted to feature-matcher-bolt or watchlist-loader-bolt or processed locally at block 162. Notifications to 'download' watchlist are sent to watchlist-loader-bolt instances, while all other notifications, except notification(s) for 'synchronized' watchlists, are sent to feature-matcher-bolt instances 34a, 34b, 34c, 34-n. Notification which has 'synchronized' watchlist is locally processed by biometrics-manager-input-spout 32 and the loading status of watchlist is updated to 'success' in global hash table 31.

If no notifications exist at block 161, or after processing all notifications at block 162, the biometrics-manager-input-spout 32 sleeps for a specified time interval at block 163 and then jumps to block 140 and continues to obtain and process notifications from biometrics-manager.

Figure 11:
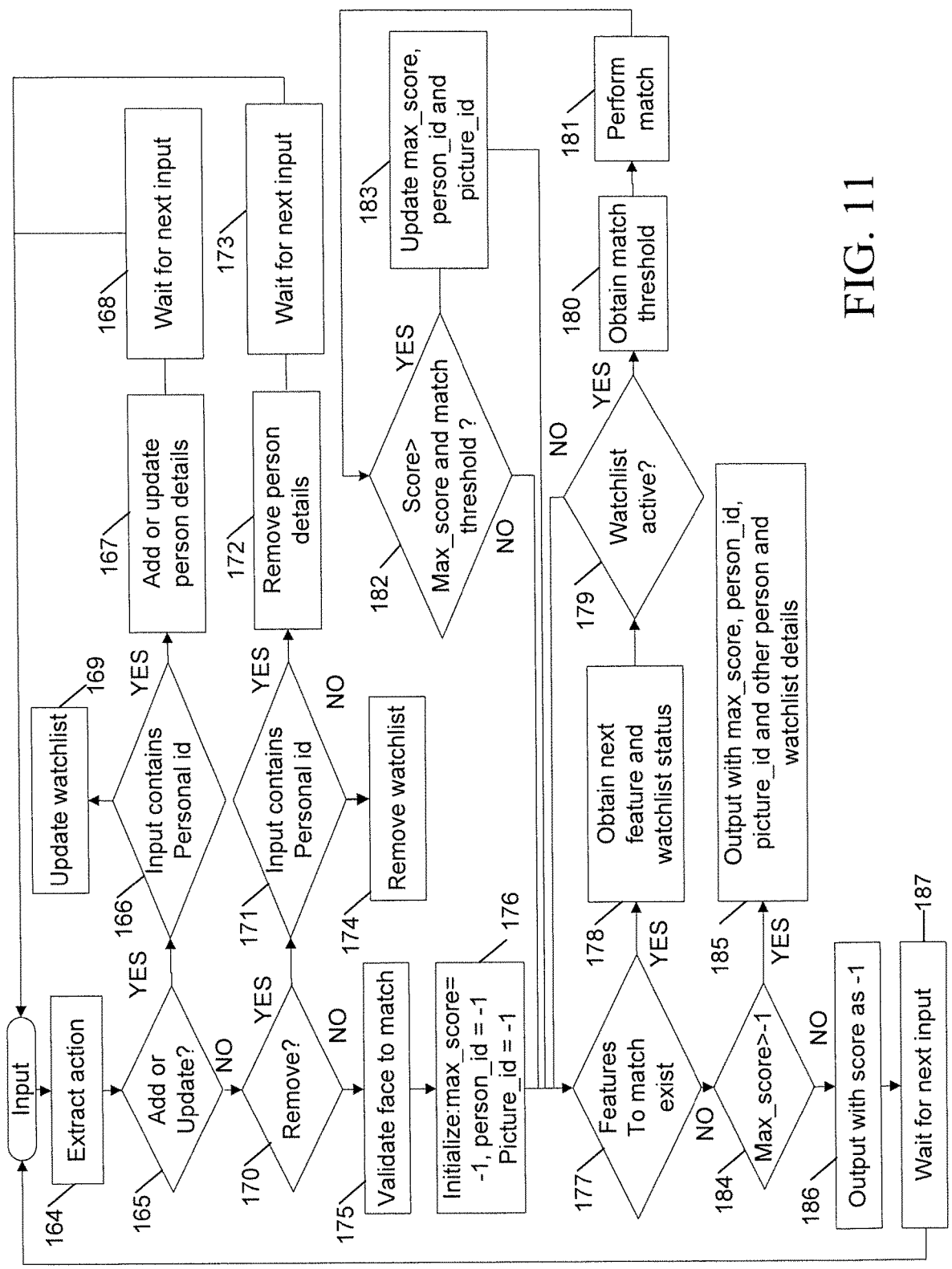
FIG. 11 is a flowchart illustrating one embodiment of the execution procedure followed by feature-matcher-bolt.

FIG. 11 illustrates one embodiment of the execution procedure followed by Feature-Matcher-Bolt 34a, 34b, 34c, 34-n. At block 164 of FIG. 11, the Feature-Matcher-Bolt instance 34a, 34b, 34c, 34-n first extracts a requested action from the input at block 164. A check is then performed at block 165, to see if the action is 'Add' or 'Update'. If the action is add/update at block 165, then the Feature-Matcher-Bolt instance 34a, 34b, 34c, 34-n checks if the input contains 'PersonId' at block 166. At block 167, if 'PersonId' is present in the input, then person details are added/updated based on the request. The Feature-Matcher-Bolt instance 34a, 34b, 34c, 34-n then waits for the next input at block 168.

If the input does not contain 'PersonId' at block 166, then Feature-Matcher-Bolt instance 34a, 34b, 34c, 34-n updates the Watchlist details at block 169.

If the action is neither 'Add' nor 'Update' at block 165, the Feature-Matcher Bolt instance 34a, 34b, 34c, 34-n performs a check to see if the action is 'Remove' at block 170. If action is 'Remove' at block 170, then Feature-Matcher-Bolt instance 34a, 34b, 34c, 34-n checks if the input contains 'PersonId' at block 171. If 'PersonId' is present in the input, then person details are removed at block 172. The Feature-Matcher-Bolt instance 34a, 34b, 34c, 34-n then waits for the next input at block 173. If the input does not contain 'PersonId' at block 171, then the Feature-Matcher-Bolt instance 34a, 34b, 34c, 34-n removes the Watchlist at block 174.

Referring back to block 170 of FIG. 11, if the action is neither add/update/remove, then the input contains a face to match at block 175. Feature-Matcher-Bolt instance then validates the face and checks if the features of the face, match with itself with a score above a threshold. If it does not match, then Feature-Matcher-Bolt instance discards the request and waits for next input.

In some embodiments, if the face is validated at block 175, then Feature-Matcher-Bolt instance 34a, 34b, 34c, 34-n initializes three variables i.e. max_score, person_id and picture_id to −1 at block 176.

Referring to block 177, a check is then performed to see if a face features to match exist. If a features to match exist, then next face feature along with its Watchlist status is obtained at block 178. In some embodiments, a check is performed to see if the watchlist is 'active' at block 179. If Watchlist is NOT 'active', then Feature-Matcher-Bolt instance goes back to block 177. If Watchlist status is 'active' at block 179, then match threshold is obtained at block 180. A face match is performed next at block 181, and a similarity score between the face received in input and the face to match is obtained.

At block 182 of FIG. 11, a check is performed to see if the score is greater than max_score and if the score is greater than match threshold. If the score is less than max_score and less than threshold, then the process goes back to block 177. If the score is greater than max_score and greater than the match threshold, then max_score, person_id and picture_id are updated at block 183, and the Feature-Matcher-Bolt instance 34a, 34b, 34c, 34-n goes back to block 177.

In some embodiments, when there are no more features to match, check is performed to see if the max_score after matching with all the features, is greater than −1 at block 84. If the max_score is greater than −1 at block 184, this is indicative that a match has been found and the max_score along with person-id, picture-id and Watchlist details are emitted to the Combiner-Bolt 35 at block 185.

Referring back to block 184 of FIG. 11, if the max_score is not greater than −1 at block 186, that means no match was found. The Feature-Matcher-Bolt instance 34a, 34b, 34c, 34-n in this case emits −1 as max_score to Combiner Bolt 35. After processing the input, performing the match against all features, Feature-Matcher-Bolt instance 34a, 34b, 34c, 34-n then waits for next input at block 187.

Figure 12:
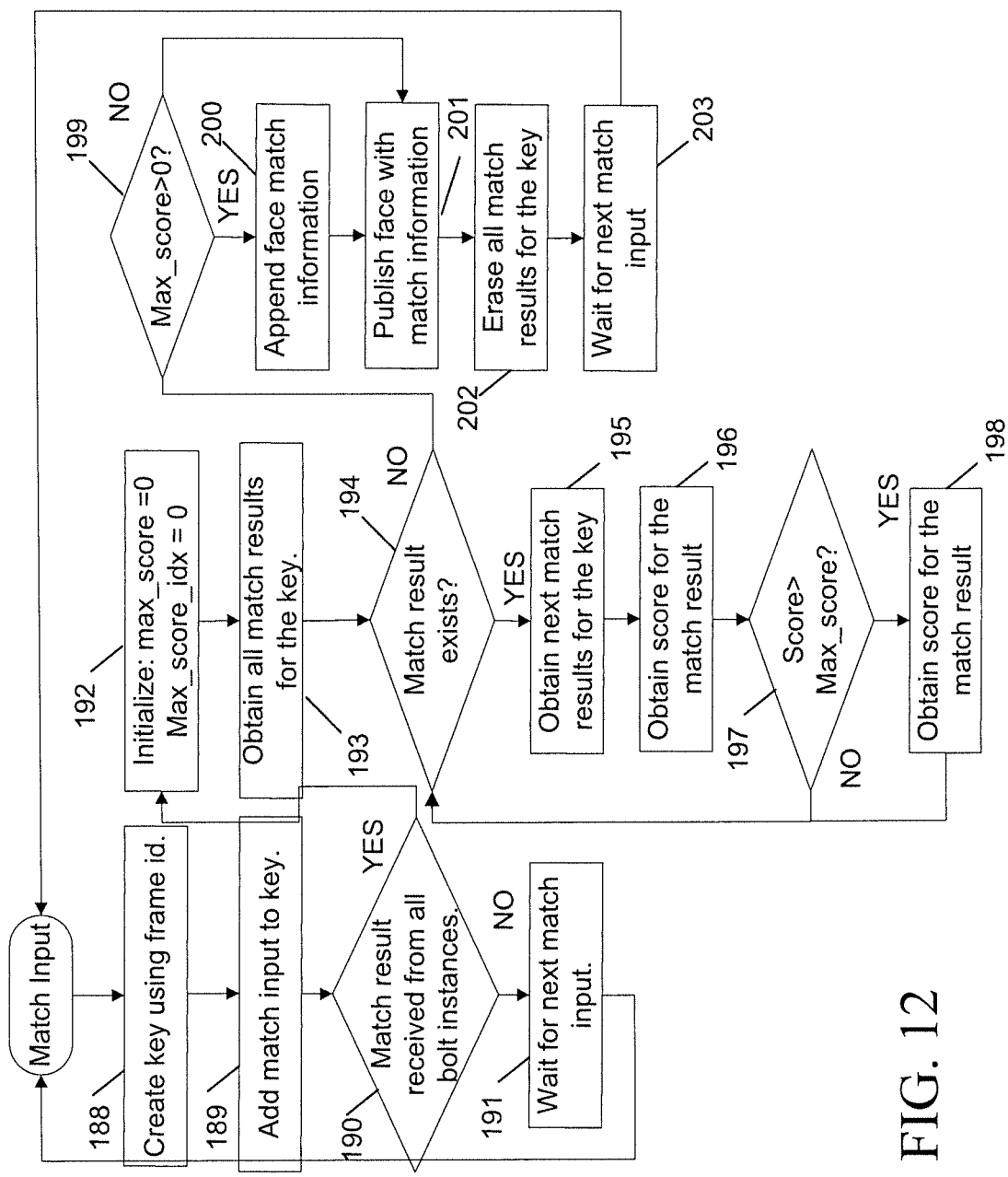
FIG. 12 illustrates one embodiment of a flowchart illustrating the execution procedure followed by the combiner-bolt.

FIG. 12 illustrates one embodiment of a flowchart illustrating the execution procedure followed by the Combiner-Bolt 35. In some embodiments, the combiner bolt 35 receives match input from various Feature-Matcher-Bolt instances 34a, 34b, 34c, 34-n and creates a key, using the frame id associated with the match input at block 188. Referring to block 189 of FIG. 11, the process flow continues with the match input being added in a map with the key created in block 188.

The Combiner-Bolt 35 then checks if it has received match results from all Feature-Matcher-Bolt instances 34a, 34b, 34c, 34-n at block 90. If the combiner bolt 62 has not received match results from all Feature-Matcher-Bolt instances 34a, 34b, 34c, 34-n, then the Combiner-Bolt 35 waits for next match input at block 191. Once match results from all Feature-Matcher-Bolt instances 34a, 34b, 34c, 34-n are obtained, the combiner-bolt 35 initializes two variables i.e. max_score and max_score_idx to 0 at block 192.

The process flow of the combiner-bolt 35 may continue with all match results for the key created in block 188 being obtained next at block 193. At block 194, the Combiner-Bolt 35 then checks if match results exist to process. If there are match results, then next match result for the key is obtained at block 195, and a score for the match result is obtained at block 196.

In a following process, the combiner-bolt 35 then checks if the score of the match result is greater than max_score at block 197. If the score of the match result is not greater than max_score at block 197, then the process flow goes back to block 194, i.e., whether a match result exists. If the score of the match result is greater than max_score at block 197, then the max_score is updated with the score and max_score_idx is updated at block 198 for the index of the match_result. The combiner-bolt 35 can then jump to block 194.

After all match results are checked and there are no more to be processed at block 194, then Combiner-Bolt 35 checks for each detected face, if the max_score is greater than 0 at block 199. If not, then the combiner-bolt 35 jumps to block 202. Block 202 of FIG. 12 includes publishing face with match information when available. If the max_score is greater than 0 at block 199, then face match information, including person name, id and match score is appended to the detected face at block 200. Detected faces with face match information, if any, are the published at block 201 for other applications to consume.

Referring to block 202 of FIG. 12, the Combiner-Bolt 35 erases all match results for the key created in block 188. After erasing all the match results for the key, the Combiner-Bolt then waits for the next match input at block 203.

Figure 13:
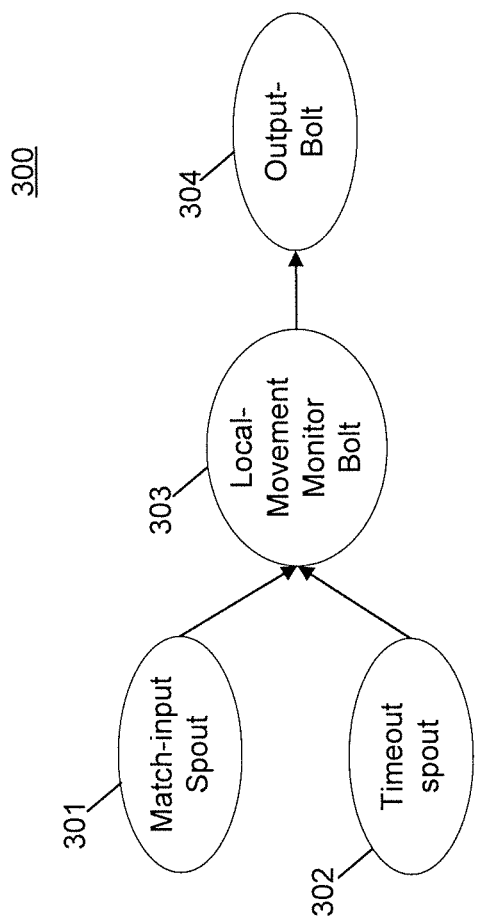
FIG. 13 illustrates one embodiment of the local movement monitor application topology.

FIG. 13 illustrates one embodiment of the local movement monitor application topology 300. The Local-Movement-Monitor application topology 300 receives detected faces along with face match and track information, processes them and sends out local movement activity of the individual at this particular camera, e.g., entered the camera, still present in front of the camera, moved within region-of-interest in the camera or left from the camera.

The processing flow for the local movement monitor topology 300 may include a matched-face-spout 301 that connects to output from face-matching, and receives detected faces along with match and track information. The matched face spout 301 further emits this information to a local-movement-monitor-bolt 303 using Broadcast connection. In some embodiments, a timeout-spout 302 also periodically sends a signal to local-movement-monitor-bolt 303 to compile and send local movement activity of individuals to output-bolt 304.

The local movement monitor bolt 303 receives detected faces along with face match and track information, processes them to identify local movement activity of individuals and periodically emits them to output-bolt 304. Activities of all individuals, e.g., entered, moved, still present or left, within the time window between signals from the Timeout-Spout 302 are sent to Output-Bolt 304. The output-bolt 304 receives local movement activity of individuals and sends them to Global-Movement-Monitor instance 16.

Figure 14:
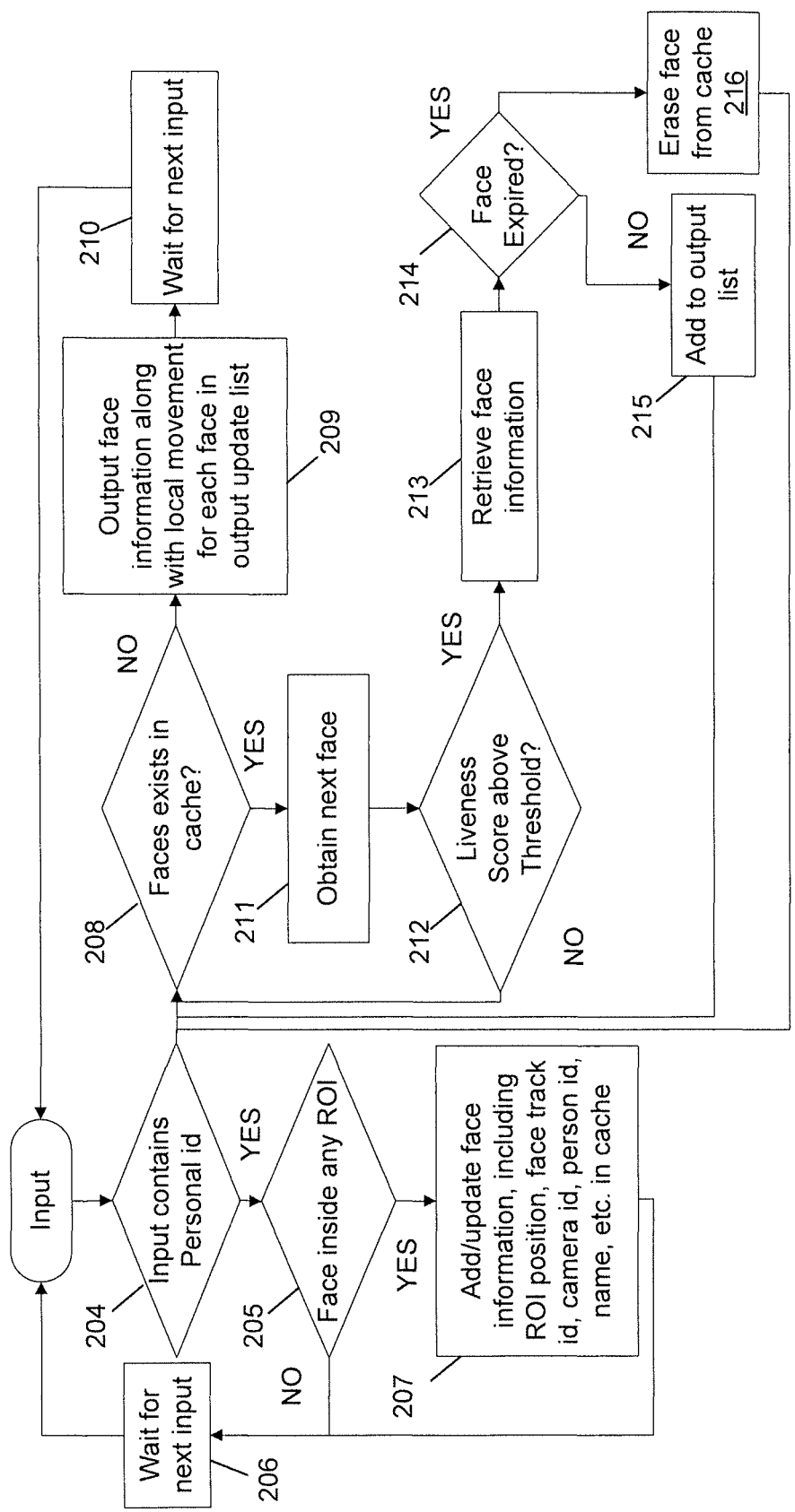
FIG. 14 illustrates one embodiment of the execution procedure followed by local-movement-monitor-bolt to identify local movement activity of individuals.

FIG. 14 illustrates one embodiment of the execution procedure followed by Local-Movement-Monitor-Bolt 303 to identify local movement activity of individuals. In some embodiments, the Local-Movement-Monitor Bolt 303 receives two types of inputs i.e. detected persons along with matching tracking information from Matched-Face-Spout 301 and signal from Timeout-Spout 302 to compile and send out local movement activity of individuals. Upon receiving the input, at block 204 the Local-Movement-Monitor-Bolt checks whether the input is related to reporting local movement or to process the matched face input. If the request is NOT for reporting local movement activity, then the face is checked at block 105, if it belongs to any of the configured region of interest (ROI). There can be one or more ROIs configured within the frame. If the face DOES NOT belong to any or the ROIs then the Local-Movement-Monitor-Bolt jumps to block 206, which includes waiting for the next input. If the face belongs to any ROI, then the face is either added (if not present already) or updated (if present already) in the cache at block 207. A Face track id is used to check whether it is already present or not in the cache. Details including ROI position, face track id, camera id, person id, name of the person, etc. is stored in cache. The Local-Movement-Monitor Bolt 303 waits for the next input.

If the request IS to report local movement activity, then Local-Movement-Monitor-Bolt checks for all faces in the cache at block 208 one by one, and when all the faces are checked at block 208, the local movement monitor bolt proceeds to block 209, at which an output is performed with face information along with local movement for each face in the output update list. Thereafter, the local movement monitor bolt 303 waits for the next input at block 210.

If faces exist in cache at block 208, the local monitor bolt 303 obtains the next face in the cache at block 211. The liveness score of the face is checked at block 212. This score indicates whether the face is of a real, live person or not. If the liveness score is below a pre-defined threshold, then Local-Movement-Monitor-Bolt 303 continues to block 208. If the liveness score 212 is above the threshold, then it is of a real, live person and face information is retrieved from the cache at block 213.

In some embodiments, the last updated timestamp of the face is checked when the time difference between current time and the last updated timestamp is greater than a pre-defined threshold, then the face is considered to have expired at block 214. If the face has not expired, then Local-Movement-Monitor-Bolt 303 continues to block 215 with adding the face to the output update list. If the face has expired at block 214, then the face is removed from cache at block 116 and Local-Movement-Monitor-Bolt 303 continues to block 208. If the face has not expired, Local-Movement-Monitor-Bolt 303 adds the face to the output update list at block 215. The Local-Movement-Monitor-Bolt 303 then jumps to block 208. All the faces in the output update list, along with local movement activity, are then sent as output.

Figure 15:
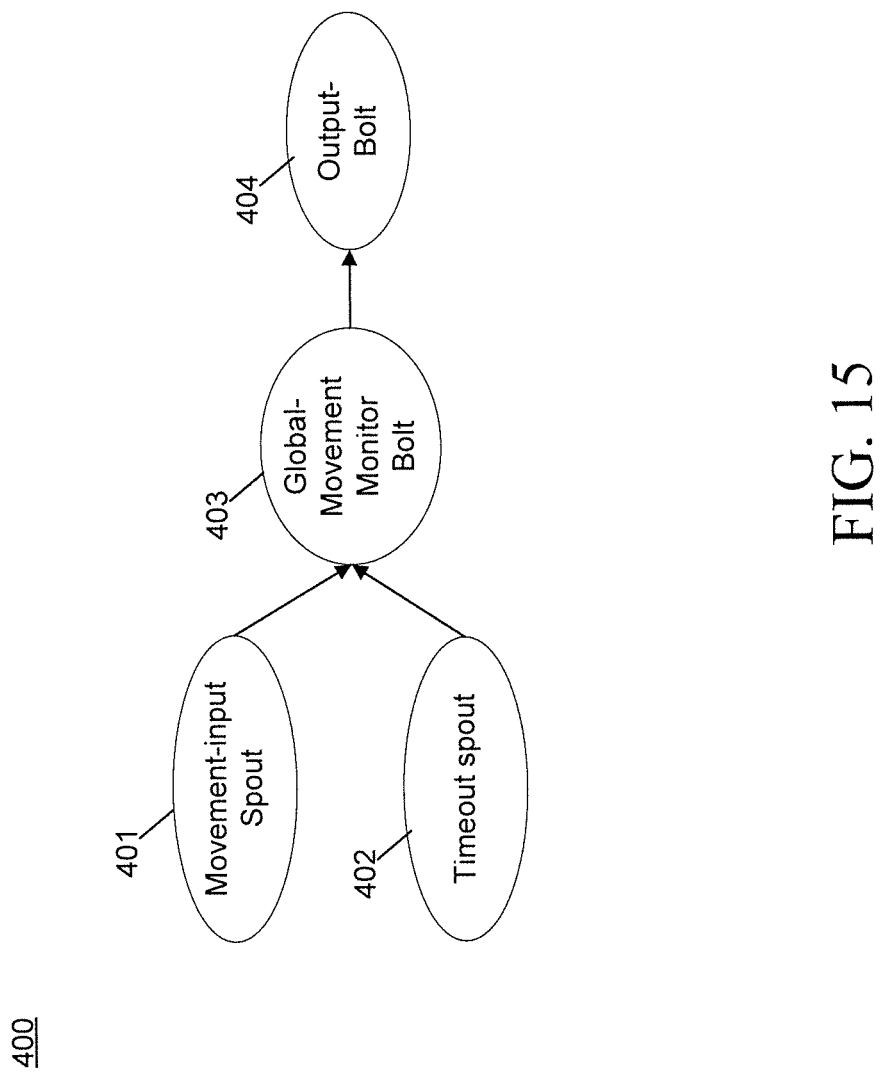
FIG. 15 illustrates one embodiment of a global-movement-monitor application topology.

FIG. 15 illustrates one embodiment of a Global-Movement-Monitor application topology 400. Global-Movement-Monitor application topology 400 receives local movement activity from all local-movement-monitor instances, processes them and sends out global movement activity of the individual i.e. entered the camera, still present in front of the camera, moved within region-of-interest in the camera, moved from one position to another in an area or left from the camera.

The movement-input-spout 401 receives local movement activity from all local-movement-monitor instances, and emits them to global-movement-monitor-bolt 303 using broadcast connection.

The timeout-spout 402 periodically sends a signal to Global-Movement-Monitor-Bolt 303 to retire old entries.

The global-movement-monitor-bolt 403 receives local movement activity from all local-movement-monitor application instances, processes them to identify global movement activity of individuals and emits them to Output-Bolt 404. Activities of all individuals, e.g., entered, moved, still present or left, within the time window between signals from Timeout-Spout 402 are sent to Output-Bolt 404.

The output-bolt 404 receives global movement activity of individuals and sends them to alerts-manager instance.

Figure 16:
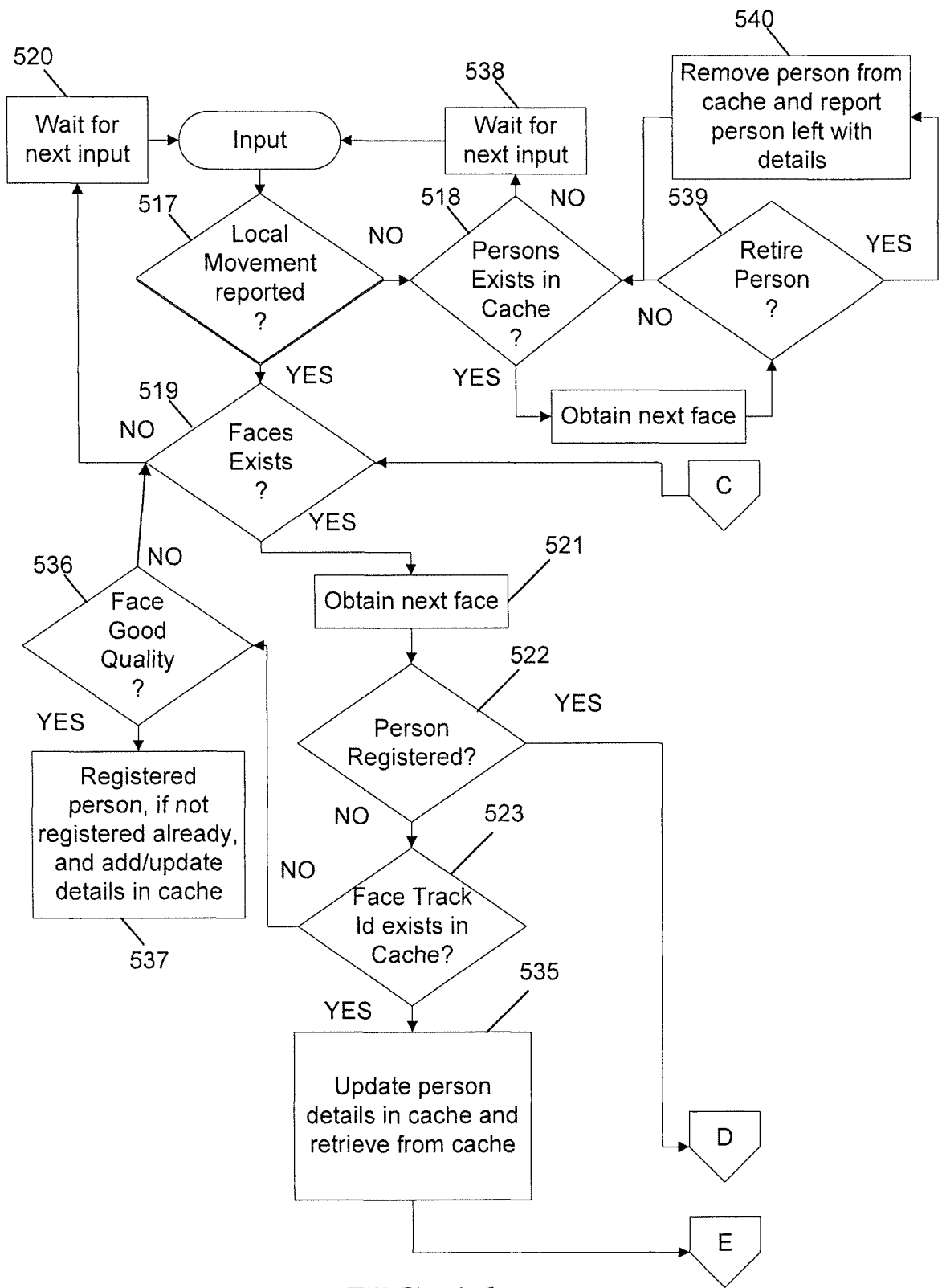
FIG. 16 is part 1 a flowchart illustrating the execution procedure followed by global-movement-monitor-bolt to identify global movement activity of individuals.
Figure 17:
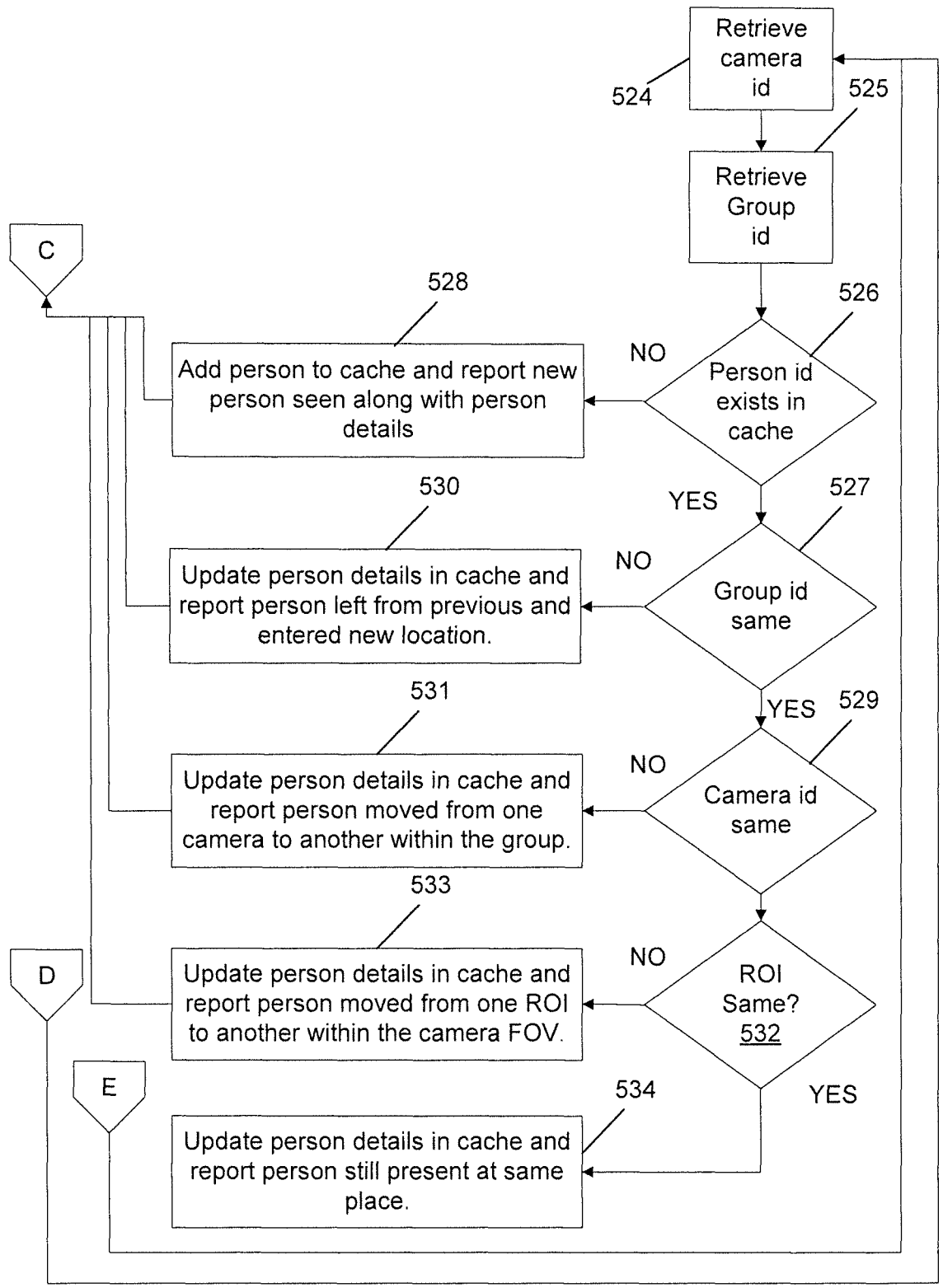
FIG. 17 is part 2 of the flowchart depicted in FIG. 16 that depicts one embodiment of an alerts manager application topology.

FIGS. 16 and 17 are a flowchart illustrating the execution procedure followed by global-movement-monitor-bolt 403 to identify global movement activity of individuals. FIG. 16 is part 1 of the process flow, in which the process flow continues with part 2 being depicted in FIG. 17, wherein page connectors labeled "C", "D" and "E" illustrate points of connectivity between FIGS. 16 and 17. The Global-Movement-Monitor Bolt receives two types of inputs, e.g., local movement activity from Movement-Input-Spout 401 and signal from Timeout-Spout 402 to remove old entries. Upon receiving the input, Global-Movement-Monitor-Bolt 403 checks whether the input has local movement activity being reported or not at block 517. If not, then Global-Movement-Monitor-Bolt continues to block 518. If the input has local movement activity at block 517, then check is performed to see if the faces exist in the input at block 519. Each face is processed one by one until no more faces are present, after which, Global-Movement-Monitor-Bolt jumps to block 520, at which the global-movement-monitor-bolt 403 waits for the next input.

Referring to FIG. 16, in a following step, the next face is obtained from the input at block 521. A check is performed at block 522 to determine if the person is registered or not by checking if the person id is present or not. If the person is not registered, e.g., the person id is not present, then Global-Movement-Monitor-Bolt 303 advances to block 523. If the person is registered, e.g., a person id IS present, then camera id is retrieved for the face at block 524. Next, group id is retrieved for the face at block 525.

Still referring to FIG. 17, the method continues with performing a check to see if the person id already exists in cache or not at block 526. If a person id does exist, then Global-Movement-Monitor-Bolt 403 continues to block 527, which includes determining whether the group id is the same. If the person id does not exist, then Global-'Movement-Monitor-Bolt 403 adds the person in cache and reports that a new person "entered" along with person details at block 528.

At block 527, a check is performed to see if the group id of the person is same as before, when it was added/updated in the cache. If it is the same at block 527, then Global-Movement-Monitor-Bolt 403 continues to block 529. If the group id is not the same at block 527, then Global-Movement-Monitor-Bolt 403 updates person details in cache and reports that the person "left" from the previous location and "entered" a new location, along with person details at block 530.

Referring to FIG. 17, at block 129 a check is performed to see if the camera id of the person is the same as before, when it was added/updated in the cache. If the camera id of the person is the same, then Global-Movement-Monitor-Bolt jumps to block 532, at which the region of interest is checked. If the camera id is not the same, then Global-Movement-Monitor-Bolt 403 updates person details in cache and reports that the person "moved" from one position to another within a marked area, along with person details at block 533.

If the group id and camera id is the same, then the ROI position within the camera is checked to see if it is the same or not. If it is the same, then Global-Movement-Monitor-Bolt jumps to block 534. If the ROI is not the same, then Global-Movement-Monitor-Bolt updates person details in cache and reports that the person "moved" from one ROI position to another, along with person details at block 533. If all details of the person are the same as before, then person details, along with last seen timestamp of the person, is updated in cache and Global-Movement-Monitor-Bolt 403 reports that the person is "still present" at the previous location, along with person details at block 534.

Referring to block 522 of FIG. 15, if the person is not registered, e.g., the person id is not present, then check is performed at block 523 to see if the face track id is present in cache or not. If face track id is present in cache, then Global-Movement-Monitor-Bolt 403 jumps to block 535, which includes updating person details in cache and retrieve from cache.

Referring to block 536 of FIG. 17, the Global-Movement-Monitor-Bolt can also check to see if the face is of good quality to enroll or not. Face parameters including frontal score, distance between the eye, etc. are checked to determine if the face is of good quality or not. If the face is not of good quality, then Global-Movement-Monitor-Bolt 403 jumps to block 519. If the face is of good quality, then Global-Movement-Monitor-Bolt 403 registers the person, if not already registered and person details are added (for new)/updated (if person already exists) in cache at block 537. In some embodiments, person details are updated and retrieved from cache and the Global-Movement-Monitor-Bolt then jumps to block 524.

Referring to block 517 of FIG. 17, if the input does not contain any local movement activity, then all persons in cache are checked one by one, after which, Global-Movement-Monitor-Bolt jumps to block 538. Next, person in cache is obtained.

In some embodiments, the difference between current time and last seen timestamp of the person is checked. If the difference is greater than a pre-defined threshold, then the person needs to be retired at block 539. If the difference is lower than the pre-defined threshold, Global-Movement-Monitor-Bolt jumps to block 518. Global-Movement-Monitor-Bolt removes the person from cache at block 140, and reports person "left" from the location, along with person details, and jumps to block 518. Global-Movement-Monitor-Bolt waits for next input.

Figure 18:
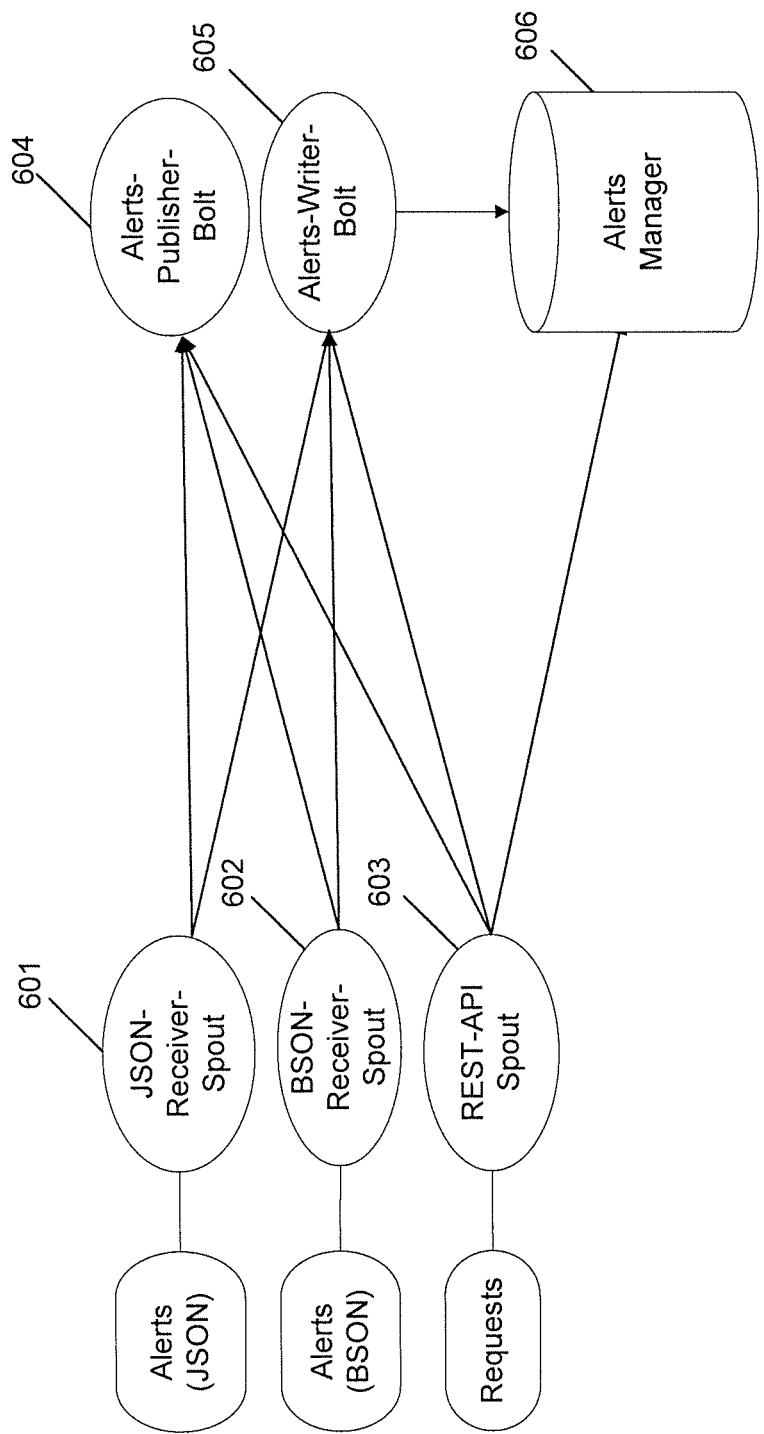
FIG. 18 is a block diagram illustrating one embodiment of an alerts-manager application topology.

FIG. 18 depicts one embodiment of an Alerts-Manager application topology 600. In some embodiments, the process flow for the alerts manager application can include a JSON- Receiver-Spout 601 that receives alerts in JSON format and emits them to Alerts-Writer-Bolt 605, and Alerts-Publisher-Bolt 604 using Broadcast connection. In some embodiments, the process flow for the alerts manager application can include a BSON-Receiver-Spout 602 that receives alerts in BSON format and emits them to Alerts-Writer-Bolt 605 and Alerts-Publisher-Bolt 604 using Broadcast connection. In some embodiments, the process flow for the alerts manager application includes a REST-API-Spout 403 that receives request to either "add" new alerts or "retrieve" historical alerts. For "add" requests, it emits them to Alerts-Writer-Bolt 605 and Alerts-Publisher-Bolt 604 using Broadcast connection. For "retrieve" requests, it connects to the database, retrieves the historical alerts and responds back with the retrieved alerts. In some embodiments, the process flow for the alerts manager application includes an Alerts-Writer-Bolt 605 that receives the alerts and writes them into a database, where all alerts are stored for specified duration of time. In some embodiments, the process flow for the alerts manager application includes an Alerts-Publisher-Bolt 604 that receives the alerts and publishes them for other applications/third-party to consume.

Figure 19:
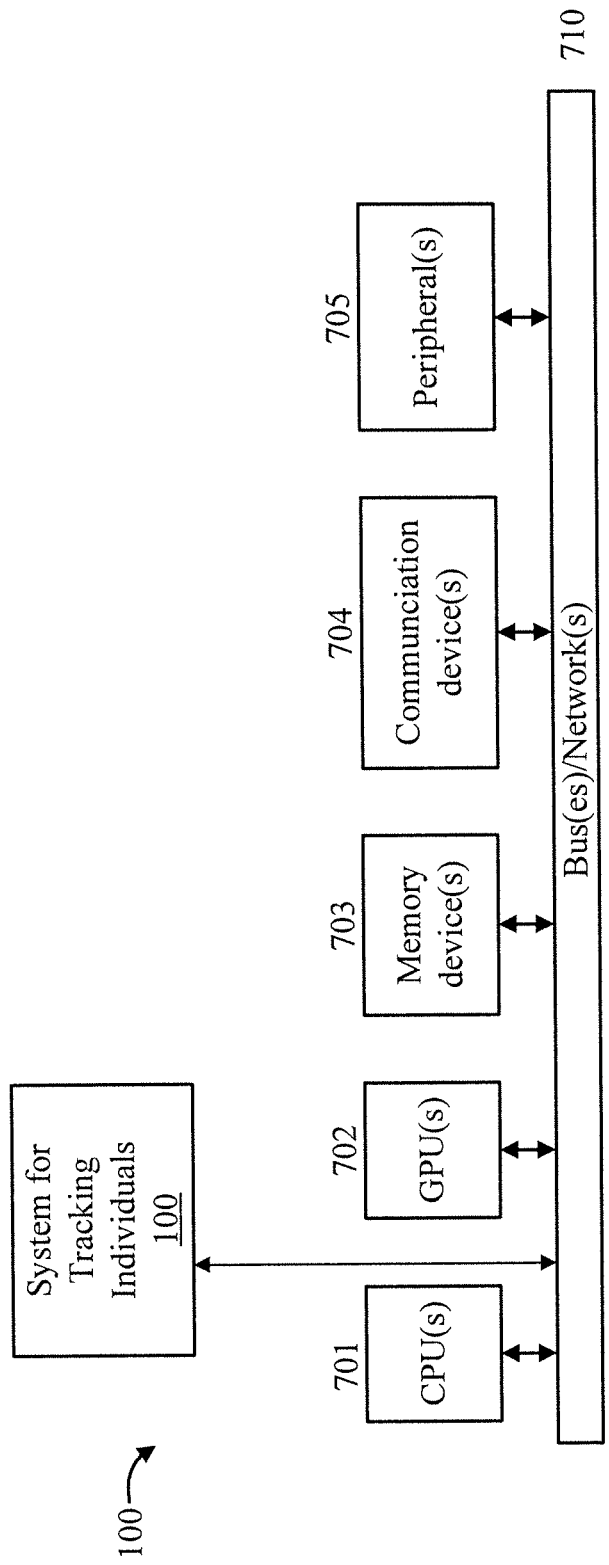
FIG. 19 is a block diagram showing an exemplary processing system, in accordance with an embodiment of the present invention.

FIG. 19 is a block diagram showing an exemplary processing system 700, in accordance with an embodiment of the present invention. The processing system 700 depicted in FIG. 19 includes integrated therein the system 100 for tracking pedestrians across facilities in real time using grouped cameras and facial recognition that is depicted in FIG. 3.

The processing system 700 further includes a set of processing units (e.g., CPUs) 701, a set of GPUs 702, a set of memory devices 703, a set of communication devices 704, and set of peripherals 705. The CPUs 701 can be single or multi-core CPUs. The GPUs 702 can be single or multi-core GPUs. The one or more memory devices 703 can include caches, RAMs, ROMs, and other memories (flash, optical, magnetic, etc.). The communication devices 704 can include wireless and/or wired communication devices (e.g., network (e.g., WIFI, etc.) adapters, etc.). The peripherals 705 can include a display device, a user input device, a printer, an imaging device, and so forth. Elements of processing system 700 are connected by one or more buses or networks (collectively denoted by the figure reference numeral 710).

In an embodiment, memory devices 703 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

In an embodiment, memory devices 103 store program code for implementing one or more of the following process flows described above with reference to FIGS. 5, 7, 8, 9, 10, 11, 13 and 15.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 700 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 700.

Figure 20:
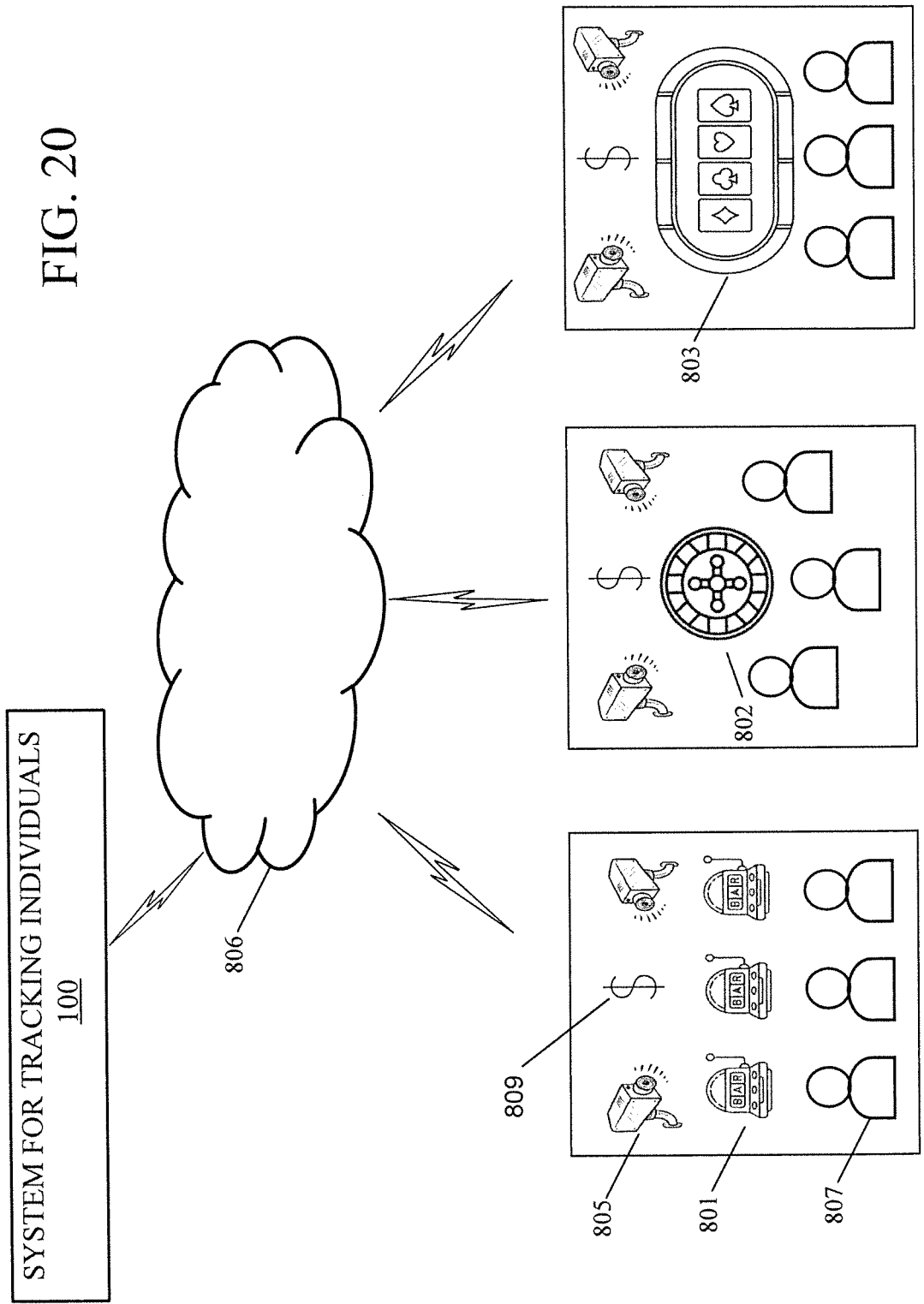
FIG. 20 is an illustration depicting the application of the systems and method described herein to a use case for tracking individuals in a physical space using camera's facial detection and a watchlist, in accordance with one embodiment of the present disclosure.

FIG. 20 illustrates one application of the methods and systems described herein. FIG. 20 illustrates a plurality of video cameras 805 grouped to different regions 801, 802, 803 in communication with the system 100 for tracking individuals through physical spaces. In the example depicted in FIG. 20, the different regions correspond to different games within a casino. The video cameras 805 can be run with specific applications to track individuals 807 through their motions through physical spaces, e.g., 801, 802, 803. By tracking the individuals 807, the use case can provide an indication of the population density for a particular region of the casino that include a particular game, providing a sense of what games are popular and what games are not popular.

The cameras 805 may be in communication with the system 100 for tracking individuals through physical spaces across a network 806. One or more portions of the network 306 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. Any one or more portions of the network 306 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The system 100 for tracking individuals can launch of a report to an application that provides an incentive for individuals to move to a specific region of the physical space. The incentive can be financial. For example, the payout 809 in the games of the regions may be increased in response to increased traffic. A third party application can automatically increase the payout of the games upon receiving the report of tracked individuals that can be an output from the system 100 for tracking individuals.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B)

only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for tracking individuals through physical spaces comprising:
   registering cameras in groupings relating to at least one physical space;
   recording individuals with the cameras in groupings relating to the at least one physical space;
   performing local video monitoring including outputting frames from the recording of the individuals with the cameras in the groupings, extracting faces from the output frames, matching faces extracted from the output frames to a watchlist, and assigning tracks to the matched faces based on the cameras in the groupings and the movement of the individuals across multiple regions of interest in the at least one physical space; and
   performing a global monitor including a biometrics monitor for preparing the watchlist of faces, the watchlist of faces being updated when a new face is detected by the cameras in the groupings, and a global movement monitor that combines the outputs from the assigned tracks including the movement of the individuals across multiple regions of interest to the matched faces to launch a report regarding individual population density at the physical space corresponding to the cameras in the groupings, the report being issued in real time and indicating the track of the individuals to the physical space that were detected by the cameras according to the regions of interest.

2. The computer-implemented method of claim 1 wherein the launch of the report is to an application that provides an incentive for individuals to move to a specific region of the physical space.

3. The computer-implemented method of claim 1 wherein the groupings relating to physical space may be a first region within an interior of a building, and a second region of a second adjacent building.

4. The computer-implemented method of claim 1, wherein said tracking individuals through physical spaces comprises recording when an individual has entered a physical space, recording when an individual is present in said physical space, recording when an individual has moved from one position to another position in the physical space, and when an individual has left a physical space.

5. The computer-implemented method of claim 1, wherein when the recording individuals with the cameras and the face matching application for matching faces extracted from the output frames to the watchlist can not identify a match, a new identification is self-registered for a non-matching individual.

6. The computer-implemented method of claim 1, wherein the performing local video monitoring comprises monitoring multiple video streams.

7. The computer-implemented method of claim 1, wherein the assigning tracks includes a time period measurement for traveling through a sequence of cameras in the cameras in the groupings relating to the at least one physical space.

8. A system for tracking individuals through physical spaces comprising:
   cameras in groupings relating to at least one physical space;
   a local video monitoring system including a video sensor input that outputs frames from inputs from the recording the individuals with the cameras in the groupings, a face detection application for extracting faces from the output frames, a face matching application for matching faces extracted from the output frames to a watchlist, and a local movement monitor that assigns tracks to the matched faces based on the cameras in the groupings and the movement of the individuals across multiple regions of interest in the at least one physical space; and
   a global monitor system including a biometrics monitor for preparing the watchlist of faces, the watchlist of faces being updated when a new face is detected by the cameras in the groupings, and a global movement monitor that combines the outputs from the assigned tracks including the movement of the individuals across multiple regions of interest to the matched faces to launch a report regarding patron population density at the physical space corresponding to the cameras in the groupings, the report being issued in real time and indicating the track of the individuals to the physical space that were detected by the cameras according to the regions of interest.

9. The system of claim 8, wherein the launch of the report is to an application that provides an incentive for individuals to move to a specific region of the physical space.

10. The system of claim 8, wherein the groupings relating to physical space may be a first region within an interior of a building, and a second region of a second adjacent building.

11. The system of claim 8, wherein the face matching application assigns an identification value to the faces.

12. The system of claim 8, wherein when the recording individuals with the cameras and the face matching application for matching faces extracted from the output frames to the watchlist can not identify a match, a new identification is self-registered for a non-matching individual.

13. The system of claim 8, wherein the performing local video monitoring comprises multiple video streams to the video sensor input.

14. The system of claim 8, wherein the assigning tracks includes a time period measurement for traveling through a sequence of cameras in the cameras in the groupings relating to the at least one physical space.

15. A computer program product is provided for tracing individuals through physical spaces, the computer program product comprising a non-transitory computer readable storage medium having computer readable program code embodied therewith, the program instructions executable by a processor to cause the processor to:

register, using the processor, cameras in groupings relating to at least one physical space;

record individuals with the cameras in groupings relating to the at least one physical space;

perform, using the processor, local video monitoring including performing local video monitoring including outputting frames from the recording of the individuals with the cameras in the groupings, extracting faces from the output frames, matching faces extracted from the output frames to a watchlist, and assigning tracks to the matched faces based on the cameras in the groupings and the movement of the individuals across multiple regions of interest in the at least one physical space; and perform, using the processor, a global monitor including a biometrics monitor for preparing the watchlist of faces, the watchlist of faces being updated when a new face is detected by the cameras in the groupings, and a global movement monitor that combines the outputs from the assigned tracks including the movement of the individuals across multiple regions of interest to the matched faces to launch a report regarding patron population density at the physical space corresponding to the cameras in the groupings, the report being issued in real time and indicating the track of the individuals to the physical space that were detected by the cameras according to the regions of interest.

16. The computer program product of claim 15, wherein the launch of the report is to an application to provide an incentive for individuals to move to a specific region of the physical space.

17. The computer program product of claim 15, wherein the groupings relating to physical space may be a first region within an interior of a building, and a second region of two adjacent buildings.

18. The computer program product of claim 15, wherein the face matching application assigns an identification value to the faces.

19. The computer program product of claim 15, wherein the recording individuals with the cameras and the face matching application for matching faces extracted from the output frames to the watchlist can not identify a match, a new identification is self-registered for a non-matching individual.

20. The computer program product of claim 15, wherein the performing local video monitoring comprises monitoring multiple video streams.

* * * * *